United States Patent
Mishima et al.

(10) Patent No.: US 8,749,487 B2
(45) Date of Patent: Jun. 10, 2014

(54) REMOTE CONTROL SYSTEM AND REMOTE CONTROL METHOD

(75) Inventors: Nobuhiro Mishima, Osaka (JP); Hidetaka Iwai, Itami (JP); Kazuo Inui, Itami (JP); Kaitaku Ozawa, Itami (JP)

(73) Assignee: Konica Minolta, Inc., Tokyo (JP)

( * ) Notice: Subject to any disclaimer, the term of this patent is extended or adjusted under 35 U.S.C. 154(b) by 574 days.

(21) Appl. No.: 12/882,046

(22) Filed: Sep. 14, 2010

(65) Prior Publication Data
US 2011/0063215 A1 Mar. 17, 2011

(30) Foreign Application Priority Data

Sep. 16, 2009 (JP) ................................. 2009-214598

(51) Int. Cl.
*G06F 3/033* (2013.01)
(52) U.S. Cl.
USPC ........ 345/158; 345/173; 348/14.05; 348/114; 715/740
(58) Field of Classification Search
USPC ............... 345/156–184, 418; 348/14.05, 114; 715/740
See application file for complete search history.

(56) References Cited

U.S. PATENT DOCUMENTS

| 8,193,901 | B2* | 6/2012 | Ota et al. ..................... | 340/3.71 |
| 2005/0184968 | A1* | 8/2005 | Uchida et al. ................. | 345/173 |
| 2007/0070060 | A1* | 3/2007 | Kagawa et al. ............... | 345/418 |
| 2007/0198845 | A1* | 8/2007 | Morikawa ..................... | 713/182 |
| 2009/0085932 | A1* | 4/2009 | Kawamoto et al. ........... | 345/629 |
| 2009/0295723 | A1* | 12/2009 | Oakley et al. ................. | 345/158 |
| 2011/0050650 | A1* | 3/2011 | McGibney et al. ........... | 345/175 |

FOREIGN PATENT DOCUMENTS

| JP | 11-212724 | 8/1999 |
| JP | 2000-207122 | 7/2000 |
| JP | 2001-255998 | 9/2001 |
| JP | 2002-149140 | 5/2002 |
| JP | 2004-120121 | 4/2004 |
| JP | 2005-197796 | 7/2005 |

OTHER PUBLICATIONS

Japanese Notice of Ground of Rejection mailed Aug. 23, 2011, directed to counterpart Japanese Application No. 2009-214598; 7 pages.
First Office Action dated Sep. 13, 2012, directed to Chinese Aplication No. 201010283011.7; 18 pages.
Rejection Decision dated Aug. 7, 2013, directed to Chinese Patent Application No. 201010283011.7; 21 pages.

* cited by examiner

*Primary Examiner* — Abbas Abdulselam
*Assistant Examiner* — Gerald Oliver
(74) *Attorney, Agent, or Firm* — Osha Liang LLP

(57) ABSTRACT

A remote control system includes a PC and a MFP capable of remotely controlling an external device. PC includes a browsing portion to receive an operation screen from the MFP, a display control portion to allow a projector to project the received operation screen onto a projection plane, and a position detection portion to detect a position pointed to by a user in the projected operation screen. The browsing portion transmits to the MFP a command which is included in the operation screen and is related to the detected position in the operation screen. The MFP includes an operation screen transmission portion to transmit to the PC the operation screen, including a command for specifying control, for accepting an operation, a command reception portion to receive a command transmitted from the PC, and a process control portion to control the external device or the device itself in accordance with the received command.

20 Claims, 29 Drawing Sheets

F I G. 1
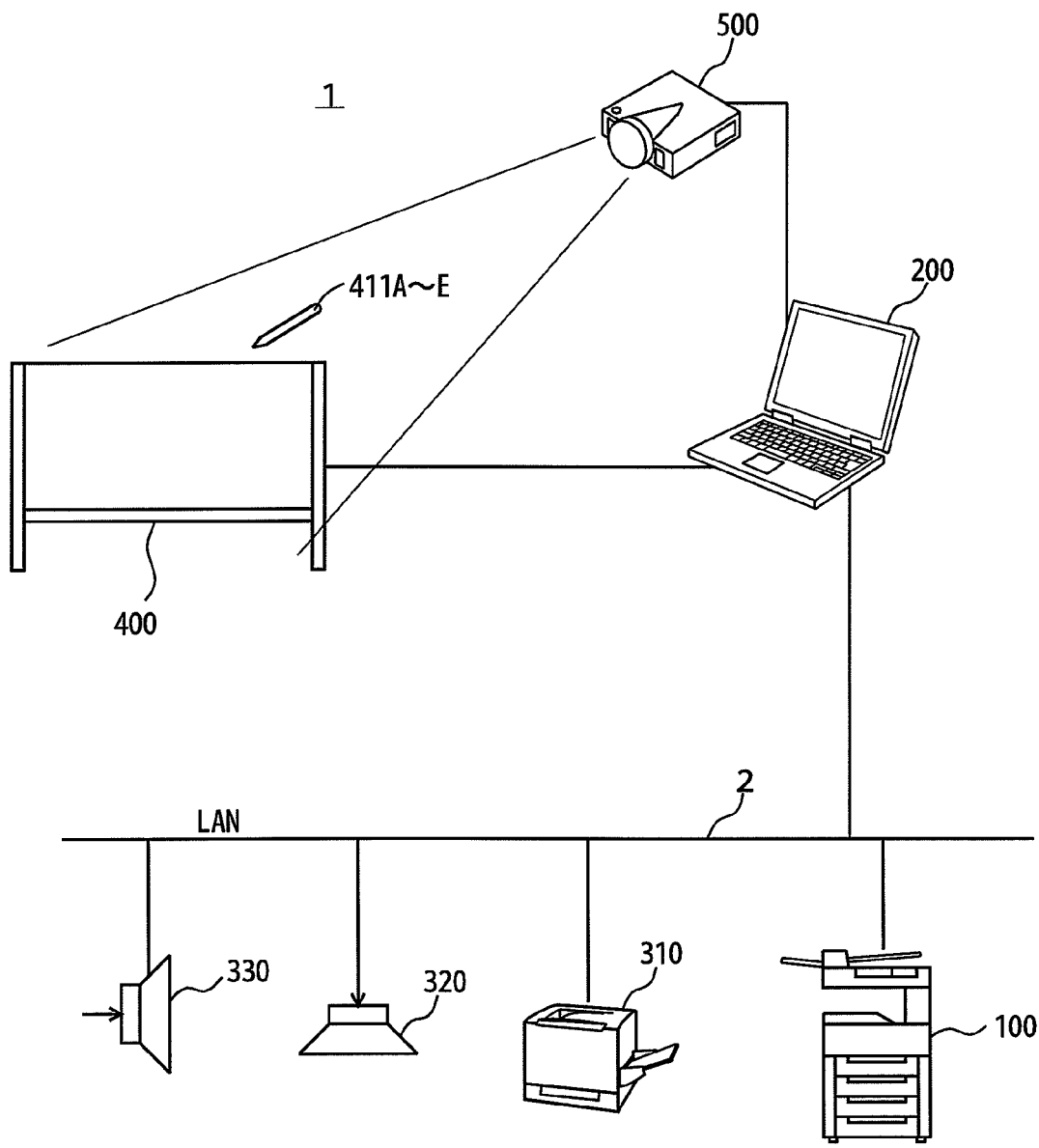

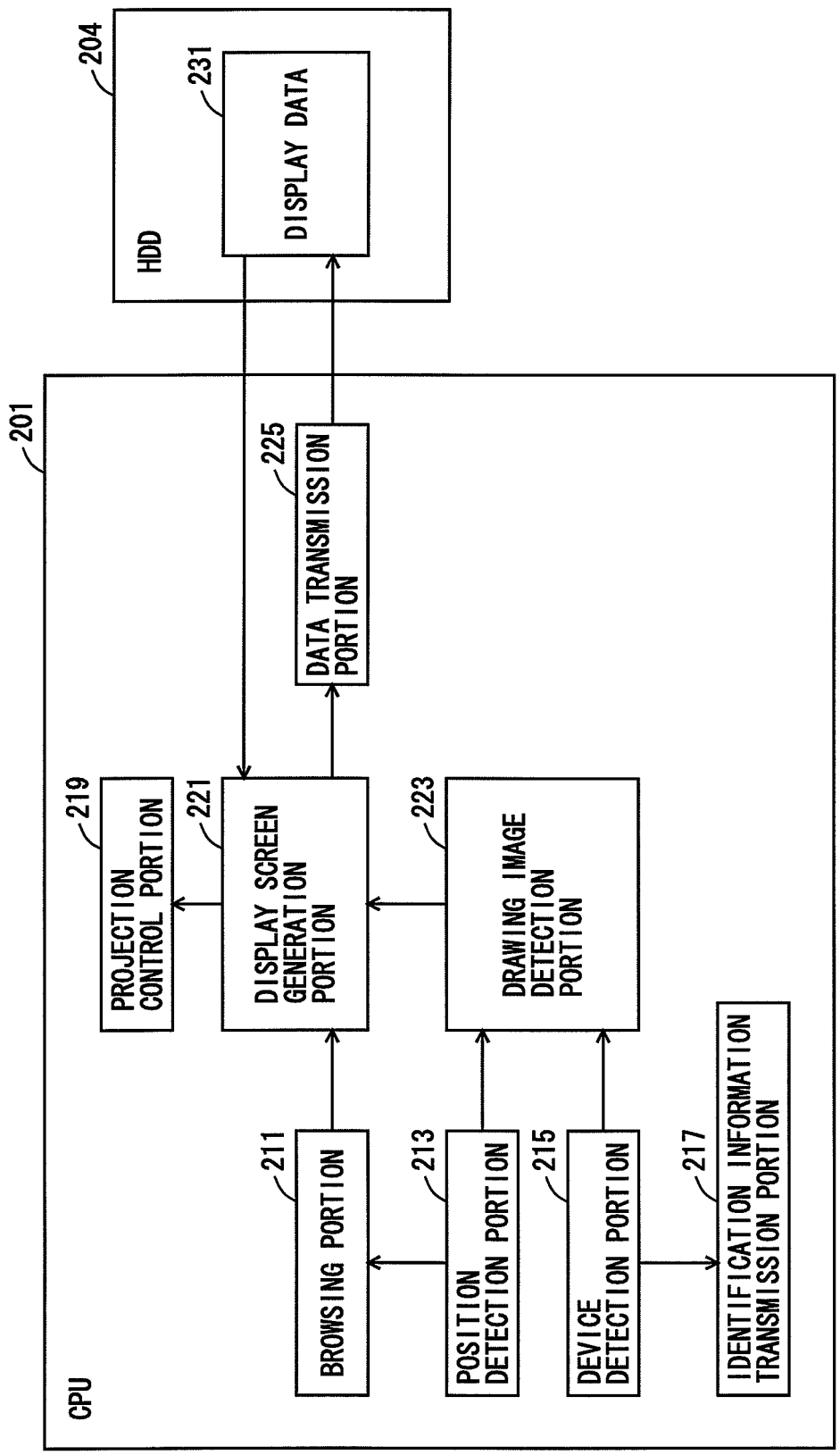
F I G. 4

F I G. 8
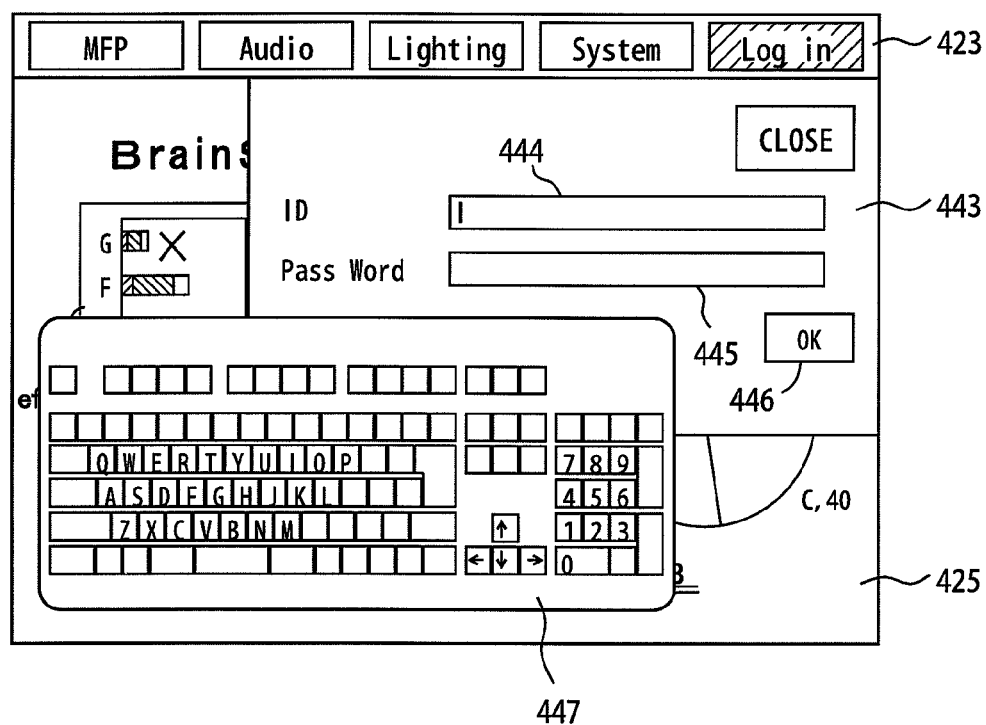

451

451

REMOTE CONTROL SYSTEM AND REMOTE CONTROL METHOD

This application is based on Japanese Patent Application No. 2009-214598 filed with Japan Patent Office on Sep. 16, 2009, the entire content of which is hereby incorporated by reference.

BACKGROUND OF THE INVENTION

1. Field of the Invention

The present invention relates to a remote control system and a remote control method, and more particularly to a remote control system including a display control device for controlling a display device projecting an image on a projection plane and a remote operation device for controlling an external device, and a remote control method executed in the remote control system.

2. Description of the Related Art

In meetings, for example, illustrations are given by projecting images of materials for illustrations on projection planes. In recent years, materials for illustrations are stored in a personal computer (PC) connected to a projector or the like serving as a display device so that the projector displays the material images output by the computer.

There is also known a technique in which when a user points a pointing stick or a laser pointer on a projection plane of a projector, a PC obtains the pointing position in the projection plane whereby the PC can be operated from the projection plane. In this case, the projection plane may function as an input device for the PC to allow a plurality of users to operate the PC.

Meanwhile, in a case where an MFP (Multi Function Peripheral) is connected to a network such as a Local Area Network (LAN), it is possible to allow the MFP to process data stored in a PC by connecting the PC to the network such as LAN and installing a driver program for remotely controlling MFP into the PC.

However, PC separately executes a projection program for executing a process of allowing a projector to project an image of data and a driver program for remotely controlling MFP. Therefore, the projection program executed by the PC is able to recognize operations input to the projection plane by more than one person but is unable to notify MFP of the information. Moreover, it is difficult to allow MFP to process data of an image projected by the projector.

SUMMARY OF THE INVENTION

The present invention is made to solve the aforementioned problem. An object of the present invention is to provide a remote control system capable of remotely controlling another device using, as a user interface, a display device which displays an image on a projection plane.

Another object of the present invention is to provide a remote control method capable of remotely controlling another device using, as a user interface, a display device which displays an image on a projection plane.

In order to achieve the above-noted object, in accordance with an aspect of the prevent invention, a remote control system includes a display control device for controlling a display device which displays an image on a projection plane, and a remote control device capable of remotely controlling an external device. The display control device includes a browsing portion to receive an operation screen from the remote control device, a display control portion to allow the display device to project the operation screen received by the browsing portion onto the projection plane, and a position detection portion to detect a position pointed to by a user in the projected operation screen. The browsing portion transmits to the remote control device a command which is included in the operation screen and is related to the position in the operation screen detected by the position detection portion. The remote control device includes an operation screen transmission portion to transmit to the display control device an operation screen, including a command for specifying control, for accepting an operation for controlling the external device or the device itself, a command reception portion to receive a command transmitted from the display control device, and a process control portion to control the external device or the device itself in accordance with the command received by the command reception portion.

In accordance with another aspect of the present invention, a remote control method is executed in a display control device for controlling a display device which displays an image on a projection plane, and in a remote control device capable of remotely controlling an external device. The method allows the display control device to execute the steps of: receiving an operation screen from the remote control device; allowing the display device to project the received operation screen onto the projection plane; detecting a position pointed to by a user in the projected operation screen; and transmitting to the remote control device a command which is included in the operation screen and is related to the position in the operation screen detected in the step of detecting a position. The method allows the remote control device to execute the steps of: transmitting to the display control device an operation screen, including a command for specifying control, for accepting an operation for controlling the external device or the device itself; receiving a command transmitted from the display control device; and controlling the external device or the device itself in accordance with the command received in the step of receiving a command.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing an exemplary meeting system in an embodiment of the present invention.

FIG. 4 is a functional block diagram showing an overview of functions of CPU of PC.

FIG. 8 is an illustration showing an exemplary window including an image of an authentication screen.

DESCRIPTION OF THE PREFERRED EMBODIMENTS

Figure 2:
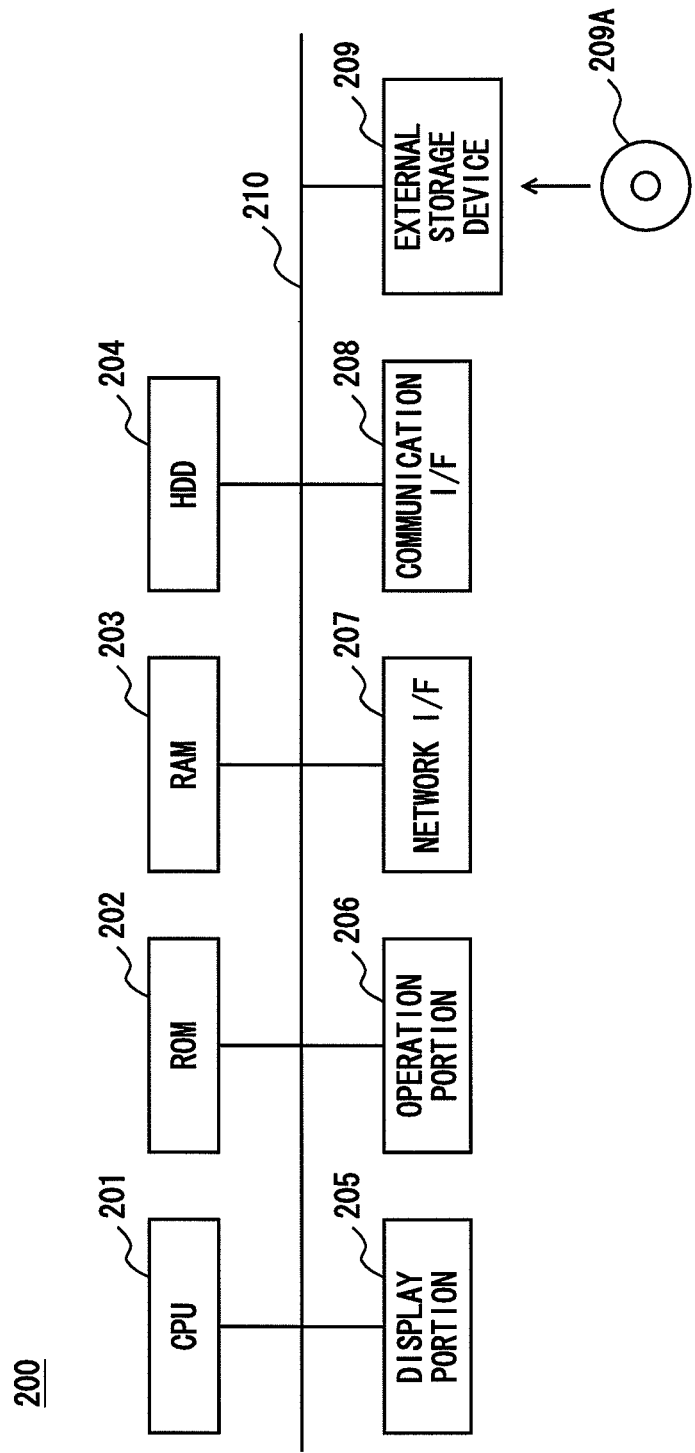
FIG. 2 is a block diagram showing an exemplary hardware configuration of PC.

In the following, an embodiment of the present invention will be described with reference to the figures. In the following description, the same parts are denoted with the same reference numerals. Their names and functions are also the same. Therefore, a detailed description thereof will not be repeated.

FIG. 1 is a diagram showing an exemplary meeting system in an embodiment of the present invention. Referring to FIG. 1, a meeting system 1 includes a PC 200, a projector 500, a whiteboard with a position detection function 400 (hereinafter referred to as "whiteboard 400"), an MFP 100, a printer 310, a lighting device 320, and an audio device 330.

PC 200 is connected with projector 500 and whiteboard 400 through a serial communication cable. Although projector 500 and whiteboard 400 are connected with PC 200 through a serial communication cable in the shown example, they may be connected through a parallel communication cable, or may be connected through LAN 2 if projector 500 and whiteboard 400 are connected to LAN 2. Although here PC 200 is connected with projector 500 and whiteboard 400 through a serial communication cable, it may be connected wirelessly.

PC 200 is a general computer and functions as a display control device which controls projector 500 to allow the projector to display an image. PC 200 receives from whiteboard 400 a position pointed to by a user on the drawing plane of whiteboard 400 with a pen 411 serving as a pointing device, and detects a drawing image. PC 200 allows projector 500 to project an image combined with the drawing image. Therefore, if the user makes a drawing on the drawing plane of whiteboard 400 with any of pens 411A-411E, a drawing image, which is not actually drawn in ink, etc. on the drawing plane, appears on the drawing plane of whiteboard 400. If a drawing is produced in ink on the drawing plane, the drawing plane has to be wiped in order to erase the drawing. In the present embodiment, a drawing is projected by projector 500 and thus can be erased from the drawing plane by stopping projection of the drawing image. This eliminates an operation of wiping the drawing plane to erase a drawing, which would be necessary if the drawing is produced in ink on the drawing plane MFP 100, PC 200, printer 310, lighting device 320, and audio device 330 are connected to Local Area Network (LAN) 2 to communicate with each other. LAN 2 may be either wired or wireless. LAN 2 may be replaced with the Internet, a Wide Area Network (WAN), a Public Switched Telephone Network, or the like.

Printer 310, lighting device 320, and audio device 330 are external devices remotely operated by MFP 100. Although here printer 310, lighting device 320, and audio device 330 are illustrated as exemplary external devices, any other electronic equipment may be used. MFP 100 has a driver program installed for remotely operating an external device and functions as a remote operation device for remotely operating an external device.

Meeting system 1 in the present embodiment functions as a remote control system for remotely controlling an external device. In meeting system 1, the presenter of a meeting stores display data, which is electronic data of presentation materials, into PC 200. Here, the display data includes page data including a plurality of pages, by way of example. PC 200 transmits to projector 500 page data of a page to be displayed among a plurality of pages included in the page data and then allows projector 500 to display an image of the page data. The format of page data transmitted from PC 200 to projector 500 is not limited as long as it can be read by projector 500. PC 200 transmits to projector 500 page data of a plurality of pages included in the display data, in order. Projector 500 in turn displays an image of page data transmitted from PC 200.

Projector 500 includes a liquid crystal display, a lens, and a light source to project an image of page data received from PC 200 on the drawing plane of whiteboard 400. The liquid crystal display displays an image. Light emitted from the light source transmits through the liquid crystal display and illuminates whiteboard 400 through the lens. When light emitted from projector 500 is applied on the drawing plane of whiteboard 400, an image produced by enlarging the image appearing on the liquid crystal display is projected on the drawing plane. Here, the drawing plane of whiteboard 400 is a projection plane on which projector 500 projects an image.

Whiteboard 400 has a drawing plane formed of a touch panel. When any one of pens 411A-411E points on whiteboard 400, whiteboard 400 communicates with each of pens 411A-411E to determine which of pens 411A-411E has pointed. Whiteboard 400 obtains as positional information the coordinates in the drawing plane pointed to by any one of pens 411A-411E and transmits to PC 200 identification information for identifying one of pens 411A-411E that points on the drawing plane and the positional information. Here, the identification information of pens 411A-411E is pen Nos. respectively assigned to pens 411A-411E.

Accordingly, when the user draws characters or figures on the drawing plane of whiteboard 400 with any one of pens 411A-411E, the pen No. and the positional information including all the coordinates included in the lines that configure the drawn characters or figures are transmitted to PC 200. PC 200 can form a drawing image of the characters or figures drawn by the user, based on the positional information, and can determine by which of pens 411A-411E they are drawn, based on the pen No.

Upon receiving the identification information and the positional information from whiteboard 400, PC 200 generates a drawing image and transmits to projector 500 a display image in which the generated drawing image is combined with an image of page data. As a result, the characters or figures drawn by the user with pen 411 on the drawing plane of whiteboard 400 are displayed as a drawing image on the drawing plane. The drawing image generated by PC 200 may be in a predetermined color corresponding to a pen No. Accordingly, the color of characters or figures drawn by a pen varies for each user.

MFP 100 functions as a Web server and stores a Web page described in a markup language to transmit the Web page to a client in response to the client's request. Here, a browsing program is installed in PC 200, and PC 200 is a client. When the URL (Uniform Resource Locator) of a Web page stored in MFP 100 is input to PC 200, PC 200 then requests MFP 100 to transmit the Web page and receives the Web page. MFP 100 stores beforehand a Web page including a menu screen, a Web page including a device's own operation screen which is an operation screen for remotely operating MFP 100 itself, a Web page including a remote operation screen which is an operation screen for remotely operating an external device, and a Web page including an authentication screen for accepting user authentication information, and transmits any particular Web page in response to a request from PC 200.

When receiving a Web page from MFP 100, PC 200 further generates a display image including an image of the Web page to allow projector 500 to display the display image. Specifically, PC 200 generates a window including an image of a Web page and generates a display image including a window including an image of page data and the window including the image of the Web page.

FIG. 2 is a block diagram showing an exemplary hardware configuration of PC. Referring to FIG. 2, PC 200 includes a CPU 201 for controlling the entire PC 200, a ROM 202 for storing a program executed by CPU 201, and the like, a RAM 203 for use as a work area for CPU 201, an HDD 204 as a mass storage device, a display portion 205, an operation portion 206 accepting input of the user's operation, a network interface (I/F) 207 for connecting PC 200 to LAN 2, a communication I/F 208 for communicating with projector 500 and whiteboard 400, and an external storage device 209 to which a CD-ROM (Compact Disc-Read Only Memory) 209A is attached.

ROM 202 stores a program executed by CPU 201 and data necessary to execute the program. RAM 203 is used as a work area when CPU 201 executes a program. In addition, RAM 203 temporarily stores a display screen transmitted to projector 500. HDD 204 is a mass storage device and is controlled by CPU 201 to store data in a nonvolatile manner.

Display portion 205 is a display such as a liquid crystal display (LCD) or an organic ELD (Electroluminescence Display). Operation portion 206 is a keyboard including a plurality of keys or a mouse and accepts input of operations by the user.

Communication I/F 208 is an interface for connecting PC 200 with projector 500 and whiteboard 400. Here, communication I/F 208 serially communicates with projector 500 and whiteboard 400. CPU 201 communicates with projector 500 and whiteboard 400 through communication I/F 208 to send/receive data.

Network I/F 207 is an interface for connecting PC 200 to LAN 2. CPU 201 communicates with MFP 100 connected to LAN 2 through network I/F 207.

CD-ROM 209A is attached to external storage device 209. CPU 201 can access CD-ROM 209A through external storage device 209. CPU 201 loads the program stored in CD-ROM 209A attached to external storage device 209 into RAM 203 for execution. It is noted that the program executed by CPU 201 is not limited to the program stored in CD-ROM 209A, and a program stored in HDD 204 may be loaded into RAM 203 for execution. In this case, another computer connected to LAN 2 through network I/F 207 may overwrite the program stored in HDD 204 of PC 200 or may additionally write a new program. Alternatively, PC 200 may download a program from another computer connected to LAN 2 and store the program in HDD 204.

The recording medium having a program stored therein is not limited to CD-ROM 209A and may be an optical disc (MO (Magnetic Optical Disc)/MD (Mini Disc)/DVD (Digital Versatile Disc)), an IC card, an optical card, or a semiconductor memory such as a mask ROM, EPROM (Erasable Programmable ROM), or EEPROM (Electronically EPROM).

The program referred to herein includes not only a program directly executable by CPU 201 but also a source program, a compressed program, an encrypted program, and the like.

Figure 3:
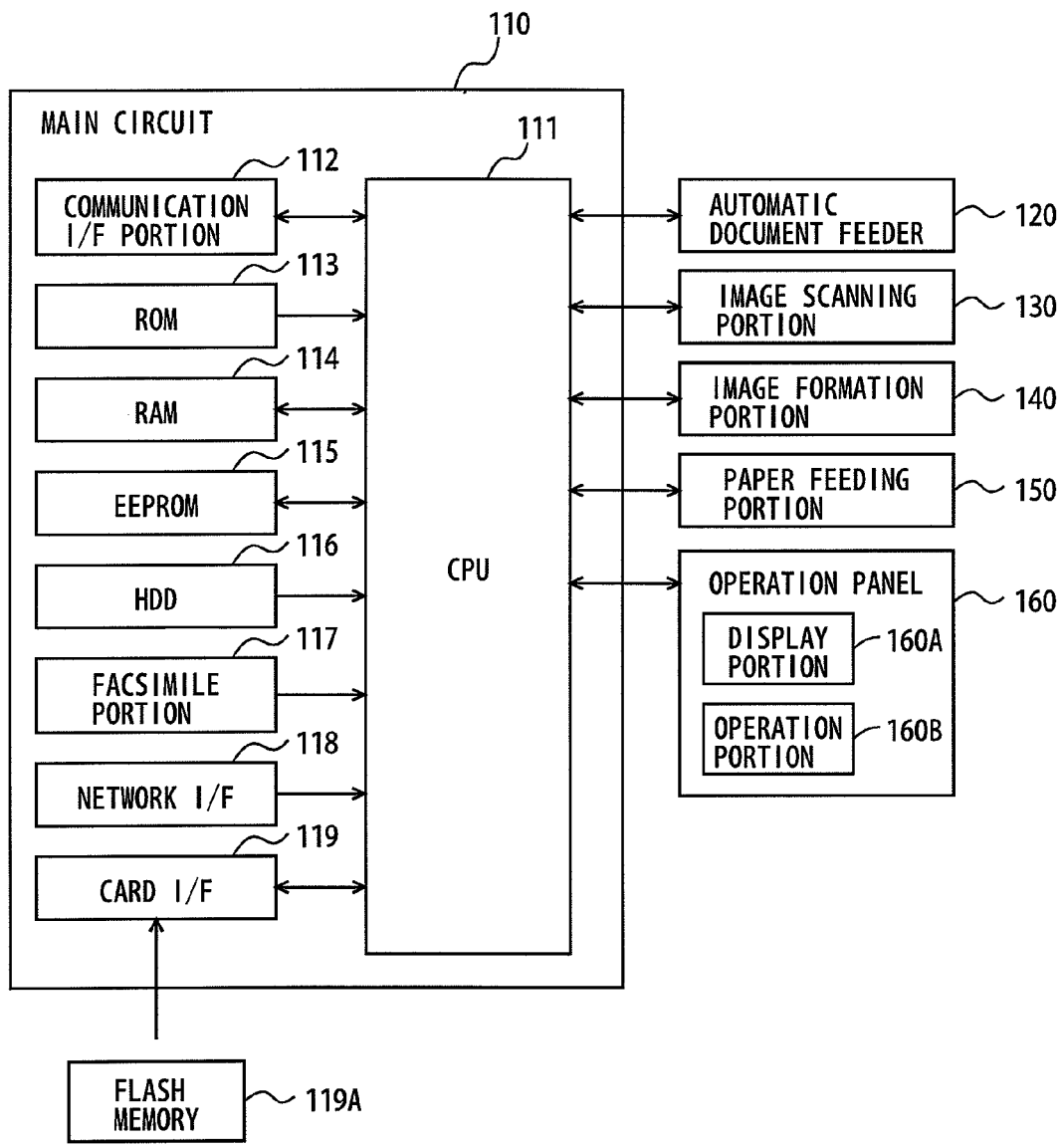
FIG. 3 is a block diagram showing an exemplary hardware configuration of MFP.

FIG. 3 is a block diagram showing an exemplary hardware configuration of MFP. Referring to FIG. 3, MFP 100 includes a main circuit 110, a document scanning portion 130 for scanning a document, an automatic document feeder 120 for transferring a document to document scanning portion 130, an image formation portion 140 for forming on paper and the like a still image output by document scanning portion 130 scanning a document, a paper-feeding portion 150 for supplying paper to image formation portion 140, and an operation panel 160 as a user interface.

Main circuit 110 includes a CPU 111, a communication interface (I/F) portion 112, a ROM 113, a RAM 114, an EEPROM (Electronically Erasable and Programmable ROM) 115, a hard disk drive (HDD) 116 as a mass storage device, a facsimile portion 117, a network I/F 118, and a card interface (I/F) 119 to which a flash memory 119A is attached. CPU 111 is connected to automatic document feeder 120, document scanning portion 130, image formation portion 140, paper-feeding portion 150, and operation panel 160 to control MFP 100 as a whole.

ROM 113 stores a program executed by CPU 111 and data necessary to execute the program. RAM 114 is used as a work area when CPU 111 executes a program.

Operation panel 160 is provided on the top face of MFP 100 and includes a display portion 160A and an operation portion 160B. Display portion 160A is a display such as a liquid crystal display or an organic ELD (Electroluminescence Display) and displays instruction menus for users, information concerning the obtained display data, and the like. Operation portion 160B includes a plurality of keys and accepts inputs of data such as characters and numerals and instructions through the user's operations corresponding to the keys. Operation portion 160B further includes a touch-panel provided on display portion 160A.

Communication I/F portion 112 is an interface for connecting MFP 100 with another device through a serial communication cable. The communication may be wireless. Printer 310, lighting device 320, and audio device 330 which are external devices may be connected through communication I/F portion 112.

Facsimile portion 117 is connected to a Public Switched Telephone Network (PSTN) to transmit facsimile data to PSTN or receive facsimile data from PSTN. Facsimile portion 117 stores the received facsimile data into HDD 116 or outputs the same to image formation portion 140. Image formation portion 140 prints the facsimile data received by facsimile portion 117 on a sheet of paper. In addition, facsimile portion 117 converts the data stored in HDD 116 into facsimile data and transmits the converted data to a facsimile machine connected to PSTN.

Network I/F 118 is an interface for connecting MFP 100 to LAN 2. CPU 111 can communicate with PC 200, printer 310, lighting device 320, and audio device 330 connected to LAN 2 through network I/F 118. CPU 111 can also communicate with a computer connected to the Internet through LAN 2. The computer connected to the Internet includes an email server sending/receiving emails. Network I/F 118 may connect not only to LAN 2 but also to the Internet, a Wide Area Network (WAN), a Public Switched Telephone Network, or the like.

Flash memory 119A is attached to card I/F 119. CPU 111 can access flash memory 119A through card I/F 119. CPU 111 loads a program stored in flash memory 119A into RAM 114 for execution. It is noted that the program executed by CPU 111 is not limited to the program stored in flash memory 119A but may be a program stored in any other storage medium, a program stored in HDD 116, or a program written into HDD 116 by another computer connected to LAN 2 through communication I/F portion 112.

FIG. 4 is a functional block diagram showing an overview of functions of CPU of PC. The functions shown in FIG. 4 are implemented by CPU 201 of PC 200 executing a remote control program stored in ROM 202 or CD-ROM 209A. Referring to FIG. 4, the functions implemented by CPU 201 include a browsing portion 211 receiving a Web page from MFP 100, a display screen generation portion 221 generating a display screen to be projected by projector 500, a projection control portion 219 controlling projector 500, a position detection portion 213 detecting a position pointed to by a user in the display screen projected on whiteboard 400, a device detection portion 215 for detecting a pointing device that points at the drawing plane of whiteboard 400, a drawing image detection portion 223 detecting a drawing image, an identification information transmission portion 217 transmitting the identification information of the pointing device to MFP 100, and a data transmission portion 225 transmitting display data to MFP 100.

Browsing portion 211 is implemented by CPU 201 executing a browsing program. When the user inputs, for example, the URL assigned to the Web page stored in MFP 100, to operation portion 206, browsing portion 211 requests transmission of the Web page of the URL through network I/F 207 and receives the Web page transmitted by MFP 100. Browsing portion 211 outputs the received Web page to display screen generation portion 221. For example, if the user inputs the URL assigned to the Web page of the menu screen (hereinafter simply referred to as "menu screen") stored in MFP 100, the menu screen is received.

Display screen generation portion 221 generates a display screen to be projected by projector 500 and outputs the generated display screen to projection control portion 219. Display screen generation portion 221 reads out display data 231 stored beforehand in HDD 204 in accordance with an operation input from operation portion 206, selects one page data from among a plurality pages of page data included in display data 231, and generates a window including an image of the selected page data. The operation input from operation portion 206 here includes an operation of specifying display data 231, a page down operation for giving an instruction to select page data on the next page, and a page up operation for giving an instruction to select page data on the previous page.

When a drawing image is input from drawing image detection portion 223 as described later, display screen generation portion 221 also generates a window including a composite image in which the drawing image is combined with an image of page data. In addition, display screen generation portion 221 generates a window including an image of a Web page input from browsing portion 211.

If a Web page is not input, display screen generation portion 221 generates a display screen including a window including an image of page data or a composite image. If a Web page is input, display screen generation portion 221 generates a display screen including a window including an image of page data or a composite image and a window including an image of the Web page.

Projection control portion 219 controls projector 500 connected through communication I/F 208 and transmits a display screen to projector 500 to allow projector 500 to project the display screen.

When communication I/F 208 receives positional information from whiteboard 400, position detection portion 213 obtains the positional information and detects a corresponding position in the display screen. Position detection portion 213 outputs the detected position to drawing image detection portion 223 and browsing portion 211. Position detection portion 213 detects a position in the window including the image of the Web page included in the display screen, in other words, a position in the operation screen, based on the positional information received from whiteboard 400.

When communication I/F 208 receives the identification information (pen No.) from whiteboard 400, device detection portion 215 obtains the identification information and detects one of pens 411A-411E. Device detection portion 215 outputs the identification information of the detected pen among pens 411A-411E to drawing image detection portion 223 and identification information transmission portion 217.

Drawing image detection portion 223 generates a drawing image based on the position in the display screen input from position detection portion 213 and the identification information input from device detection portion 215. If the position in the display screen is anywhere other than the window including the image of the Web page, of the windows included in the display screen, drawing image detection portion 223 generates a drawing image having the same size as the display screen where only a pixel at the position in the display screen has a predetermined color corresponding to the identification information (pen No.). Drawing image detection portion 223 outputs the generated drawing image to display screen generation portion 221.

In response to network I/F 207 receiving a transmission request for identification information from a remote control device, here, MFP 100, identification information transmission portion 217 transmits the identification information input from device detection portion 215 to MFP 100, which has transmitted the transmission request for the identification information, through network I/F 207. Identification information transmission portion 217 sends the identification information that is input from device detection portion 215 most recently before receiving the transmission request for the identification information.

In response to network I/F 207 receiving a data transmission request from a remote control device, here, MFP 100, data transmission portion 225 sends display data 231 to be displayed by projector 500 to MFP 100, which has transmitted the data transmission request, through network I/F 207. In place of or in addition to the display data, an image of a window including the image of the display data included in the display screen may be sent. In this case, an image produced by combining a drawing image with the image of the display data is transmitted.

If the position input from position detection portion 213 is a predetermined position in an image of a Web page, browsing portion 211 executes a command associated with the predetermined position.

Figure 5:
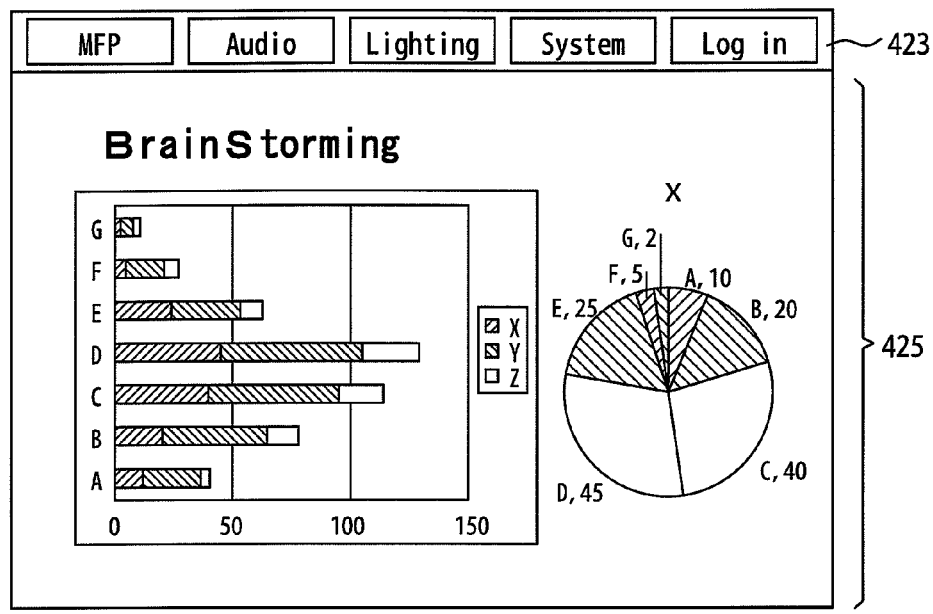
FIG. 5 is a first illustration showing an exemplary display screen.

FIG. 5 is a first illustration showing an exemplary display screen. Referring to FIG. 5, a display screen 421 includes a window 423 including an image of a Web page and a window 425 including an image of page data. Window 423 here includes an image of the menu screen. The image of the menu screen included in window 423 includes a button represented by "MFP," a button represented by "Audio," a button represented by "Lighting," a button represented by "System," and a button represented by "Log in."

Figure 6:
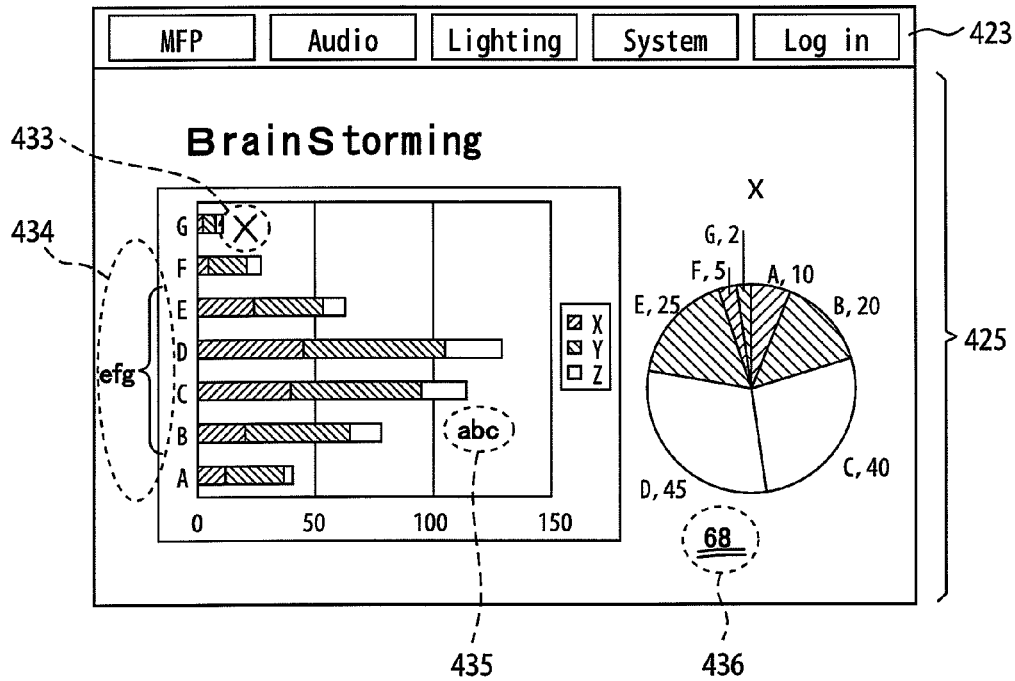
FIG. 6 is a second illustration showing an exemplary display screen.

FIG. 6 is a second illustration showing an exemplary display screen.

Referring to FIG. 6, display screen 431 shows that window 425 including the image of the page data in display screen 421 shown in FIG. 5 includes a composite image in which drawing images 433-436 are combined with the image of the page data. Here, drawing image 433 is drawn in black by pen 411A. Drawing image 434 is drawn in red by pen 411B. Drawing image 435 is drawn in blue by pen 411C. Drawing image 436 is drawn in yellow by pen 411D.

Figure 7:
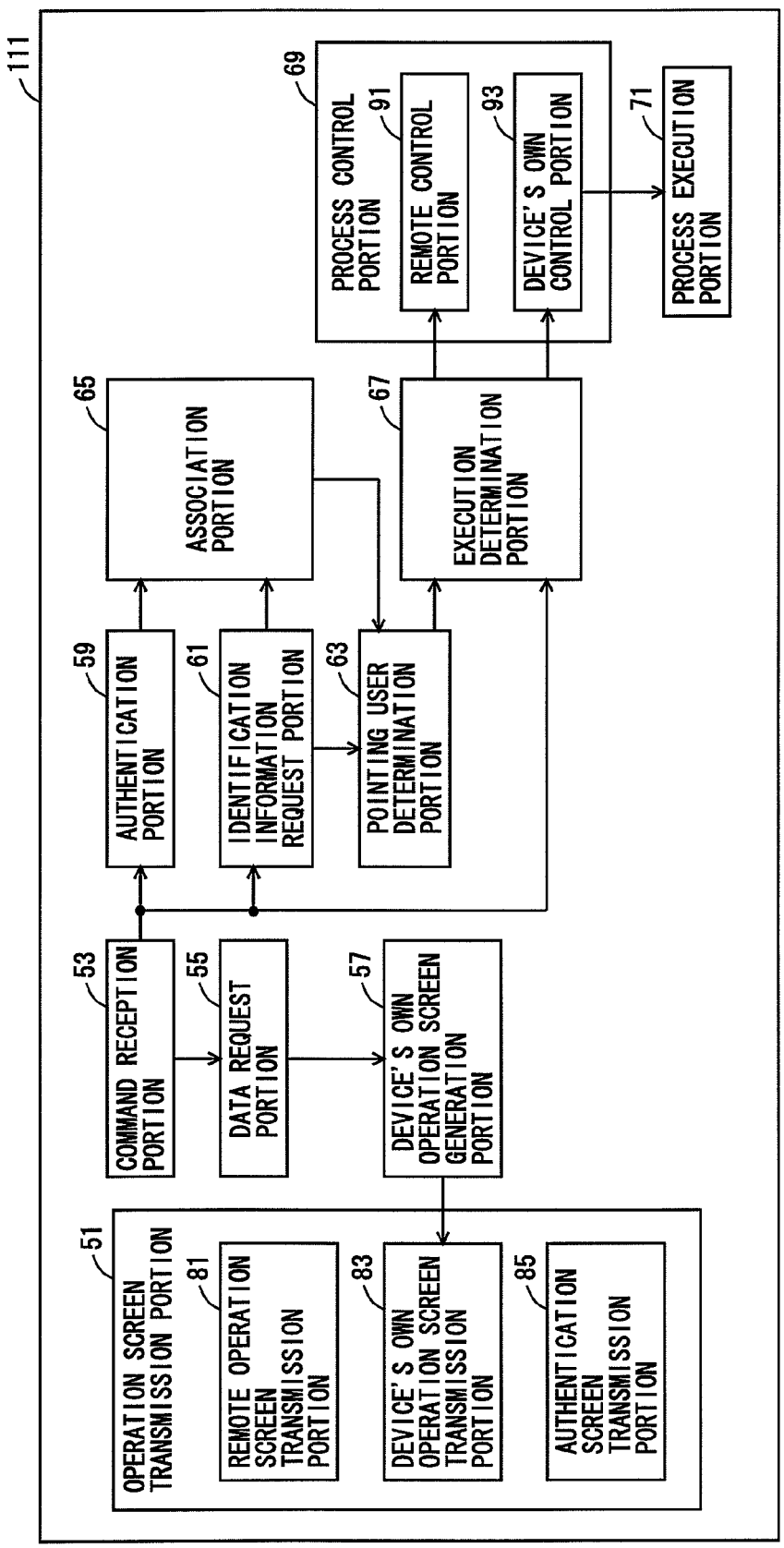
FIG. 7 is a functional block diagram showing an example of functions of CPU of MFP.

FIG. 7 is a functional block diagram showing an example of functions of CPU of MFP. The functions shown in FIG. 7 are implemented by CPU 111 of MFP 100 executing a remote control program stored in ROM 113 or flash memory 119A. Referring to FIG. 7, the functions implemented by CPU 111 include an operation screen transmission portion 51 transmitting a Web page to a client, a command reception portion 53 receiving a command from a client, a data request portion 55 requesting data from a client, a device's own operation screen generation portion 57 generating a device's own operation screen, an authentication portion 59 authenticating a user, an identification information request portion 61 requesting identification information of a pointing device, an association portion 65 associating a user with a pointing device, a pointing user determination portion 63 determining the user who points, an execution determination portion 67 determining whether a process based on pointing is executable or not, a process execution portion 71 executing a process based on pointing, and a process control portion 69 controlling process execution portion 71 or an external device.

The client is here PC 200 which functions as a display control device. When network I/F 118 receives a transmission request for a Web page from PC 200, operation screen transmission portion 51 sends a Web page stored beforehand in HDD 116 or a Web page generated by device's own operation screen generation portion 57 as described later, to PC 200 through network I/F 118.

The Web page includes a Web page including the menu screen (simply referred to as "menu screen" hereinafter), a Web page including the device's own operation screen (simply referred to as "device's own operation screen" hereinafter) for accepting an operation for controlling the device itself, that is, MFP 100, a Web page including the remote operation screen (simply referred to as "remote operation screen" hereinafter) for accepting an operation for controlling an external device, here, printer 310, lighting device 320, and audio device 330, and a Web page including an authentication screen (simply referred to as "authentication screen" hereinafter).

Operation screen transmission portion 51 includes a remote operation screen transmission portion 81, a device's own operation screen transmission portion 83, and an authentication screen transmission portion 85. Remote operation screen transmission portion 81 transmits the remote operation screen, device's own operation screen transmission portion 83 transmits the device's own operation screen, and authentication screen transmission portion 85 transmits the authentication screen.

The Web page includes a command which is related to a position in the screen for specifying control over MFP 100 or an external device.

Here, returning to FIG. 4, if the user inputs the URL of the menu screen to PC 200, browsing portion 211 sends the URL of the menu screen to MFP 100 and receives the menu screen transmitted from MFP 100. The display screen including the window including the image of the received menu screen is projected by projector 500 on the drawing plane of whiteboard 400.

Here, a description will be made to a case where display screen 421 shown in FIG. 5 is projected on the drawing plane of whiteboard 400, by way of example. Window 423 includes an image of the menu screen. In the menu screen, the buttons represented by "MFP," "System," and "Log in" are associated with a command requesting transmission of the device's own operation screen for accepting an operation for controlling MFP 100, the button represented by "Audio" is associated with a command requesting transmission of the remote operation screen for accepting an operation for controlling audio device 330, and the button represented by "Lighting" is associated with a command requesting transmission of the remote operation screen for accepting an operation for controlling lighting device 320. The device's own operation screen here includes a Web page including an MFP operation screen (simply referred to as "MFP operation screen" hereinafter) for accepting an operation for controlling MFP 100, a Web page including a system setting screen (simply referred to as "system setting screen" hereinafter) for accepting system settings, and an authentication screen.

Referring to FIG. 4, when the positional information indicating a position within the button represented by "MFP" included in the image of the menu screen is input from position detection portion 213, browsing portion 211 of PC 200 executes the command associated with the button represented by "MFP" and requests transmission of the MFP operation screen from MFP 100. Specifically, a command including the URL assigned to the MFP operation screen to transmit the MFP operation screen is transmitted to MFP 100. Upon receiving the MFP operation screen from MFP 100, browsing portion 211 outputs the MFP operation screen to display screen generation portion 221, so that a window including the image of the MFP operation screen appears on the drawing plane of whiteboard 400.

When the positional information indicating a position within the button represented by "Audio" included in the image of the menu screen is input from position detection portion 213, browsing portion 211 executes the command associated with the button represented by "Audio" and requests transmission of the remote operation screen for accepting an operation for controlling audio device 330 from MFP 100. Specifically, a command including the URL assigned to the remote operation screen for audio device 330 to transmit the remote operation screen is transmitted to MFP 100. Upon receiving the remote operation screen from MFP 100, browsing portion 211 outputs the remote operation screen to display screen generation portion 221, so that a window including the image of the remote operation screen appears on the drawing plane of whiteboard 400.

When the positional information indicating a position within the button represented by "Lighting" included in the image of the menu screen is input from position detection portion 213, browsing portion 211 executes the command associated with the button represented by "Lighting" and requests transmission of the remote operation screen for accepting an operation for controlling lighting device 320 from MFP 100. Specifically, a command including the URL assigned to the remote operation screen for lighting device 320 to transmit the remote operation screen is transmitted to MFP 100. Upon receiving the remote operation screen from MFP 100, browsing portion 211 outputs the remote operation screen to display screen generation portion 221, so that a window including the image of the remote operation screen appears on the drawing plane of whiteboard 400.

When the positional information indicating a position within the button represented by "System" included in the image of the menu screen is input from position detection portion 213, browsing portion 211 executes the command associated with the button represented by "System" and requests transmission of the device's own operation screen for accepting system settings from MFP 100. Specifically, a command including the URL assigned to the system setting screen of the device's own operation screens to transmit the system setting screen is transmitted to MFP 100. Upon receiving the system setting screen from MFP 100, browsing portion 211 outputs the system setting screen to display screen generation portion 221, so that a window including the image of the system setting screen appears on the drawing plane of whiteboard 400.

When the positional information indicating a position within the button represented by "Log in" included in the image of the menu screen is input from position detection portion 213, browsing portion 211 executes the command associated with the button represented by "Log in" and requests transmission of the authentication screen from MFP 100. Specifically, a command including the URL assigned to the authentication screen of the device's own operation screens to transmit the authentication screen is transmitted to MFP 100. Upon receiving the authentication screen from MFP 100, browsing portion 211 outputs the authentication screen to display screen generation portion 221, so that a window including the image of the authentication screen appears on the drawing plane of whiteboard 400.

Returning to FIG. 7, command reception portion 53 controls network I/F 118 to receive a command from PC 200 and outputs the received command to authentication portion 59, identification information request portion 61, and execution determination portion 67.

Here, the authentication screen will be described. The authentication screen includes an image of the authentication screen and an image of a keyboard. FIG. 8 shows an exemplary window including the image of the authentication screen. FIG. 8 shows the display screen displayed by projector 500 after PC 200 receives the authentication screen in a state in which it allows projector 500 to display the display screen 421 shown in FIG. 5. Referring to FIG. 8, a window 443 including an image of the authentication screen and a window 447 including an image of a keyboard including alphanumeric keys are superimposed on window 425 including an image of page data.

Window 443 includes a field 444 in which ID is set, a field 445 in which a password is set, and a button 446 represented by "OK." ID is user identification information for identifying a user.

When, for example, the user who uses pen 411A points to field 444 with pen 411A and thereafter each time the user points to the alphanumeric keys in window 447, browsing portion 211 of CPU 201 of PC 200 sets a character corresponding to each position that is pointed to. Accordingly, the user can set an ID in field 444. Similarly, each time the user points to an alphanumeric key in window 447 after pointing to field 445 with pen 411A, browsing portion 211 sets a character in field 445. Accordingly, the user can set a password in field 445. Then, when the user points to the inside of the button represented by "OK," browsing portion 211 of CPU 201 of PC 200 executes a command associated with the characters "OK," and sends to MFP 100 an authentication command for specifying control over MFP 100. Specifically, the "OK" button is associated with the ID set in field 444, the password set in field 445, and the authentication command that designates authentication, which are transmitted to MFP 100.

Returning to FIG. 7, when receiving the authentication command from PC 200, command reception portion 53 outputs the ID and the password received together to authentication portion 59 and also outputs a request instruction to identification information request portion 61.

Authentication portion 59 performs authentication using the entered ID and password. For example, user data including an ID and a predetermined password assigned to a user who is permitted to use meeting system 1 is stored in HDD 116, so that a user is authenticated on condition that the user data including the ID and password identical to the entered ID and password is stored. If authenticating, authentication portion 59 outputs the ID to association portion 65.

In response to input of the request instruction, identification information request portion 61 sends a transmission request for identification information to PC 200 through network I/F 118. Upon receiving the transmission request for identification information, PC 200 sends back identification information of pens 411A-411E that is detected most recently by device detection portion 215. Then, identification information request portion 61 receives the identification information sent back from PC 200 and outputs the same to association portion 65 and pointing user determination portion 63.

Immediately upon receiving the request instruction, in other words, immediately upon receiving the command from PC 200 by command reception portion 53, identification information request portion 61 sends the transmission request for identification information. On the other hand, PC 200 sends back the identification information of pens 411A-411E that is detected most recently by device detection portion 215. Therefore, on the MFP 100 side, the pen that designates transmission of the command, here, the pen that points to the button represented by "OK" included in the image of the authentication screen, can be specified by the identification information received by identification information request portion 61.

Association portion 65 associates the ID input from authentication portion 59 with the identification information input from identification information request portion 61. Therefore, it is possible to distinguish which of pens 411A-411E is used by which of a plurality of users, thereby enabling a plurality of users to use meeting system 1.

If receiving a data request command from PC 200, command reception portion 53 outputs a data request instruction to data request portion 55. The data request command is sent from PC 200 to MFP 100 if the device's own operation screen sent by device's own operation screen transmission portion 83 includes the data request command and if that device's own operation screen is sent to PC 200. The device's own operation screen including the data request command will be described later.

In response to input of the data request instruction, data request portion 55 sends a data transmission request to PC 200 through network I/F 118. Upon receiving the data transmission request, PC 200 sends display data 231 to be displayed by projector 500, to MFP 100 which has transmitted the data transmission request, through network I/F 207. When network I/F 118 receives the data from PC 200, data request portion 55 outputs the data to device's own operation screen generation portion 57. This enables MFP 100 to process data received from PC 200.

Device's own operation screen generation portion 57 generates a device's own operation screen in which input data can be edited, and outputs the generated device's own operation screen to device's own operation screen transmission portion 83. Device's own operation screen transmission portion 83 sends the device's own operation screen input from device's own operation screen generation portion 57 to PC 200.

If receiving a command other than the authentication command and the data request command from PC 200, command reception portion 53 outputs the command to execution determination portion 67 and also outputs a request instruction to identification information request portion 61. Pointing user determination portion 63 receives identification information from identification information request portion 61 to determine the user associated with the identification information by association portion 65. Pointing user determination portion 63 outputs the ID of the determined user to execution determination portion 67.

Execution determination portion 67 determines whether the user having the ID input from pointing user determination portion 63 is permitted to execute a process specified by a command input from command reception portion 53. For example, a restriction table in which whether a process is executable or not is defined for each user is stored in HDD 116 beforehand, so that whether execution is permitted or not is determined by referring to the restriction table. If it is determined that execution is permitted, execution determination portion 67 outputs the command input from command reception portion 53 to process control portion 69. If it is determined that execution is not permitted, execution determination portion 67 does not output the command input from command reception portion 53 to process control portion 69. As a result, a process can be executed based on only pointing by a user permitted beforehand.

Process control portion 69 includes a remote control portion 91 controlling an external device and a device's own control portion 93 controlling process execution portion 71. Upon receiving a command for specifying control over an external device from execution determination portion 67, remote control portion 91 executes the command to control the external device through communication I/F 112. Upon receiving a command for specifying control over MFP 100 from execution determination portion 67, device's own control portion 93 executes the command to control process execution portion 71. Process execution portion 71 is controlled by device's own control portion 93 to execute a process in accordance with a command.

Figure 9:
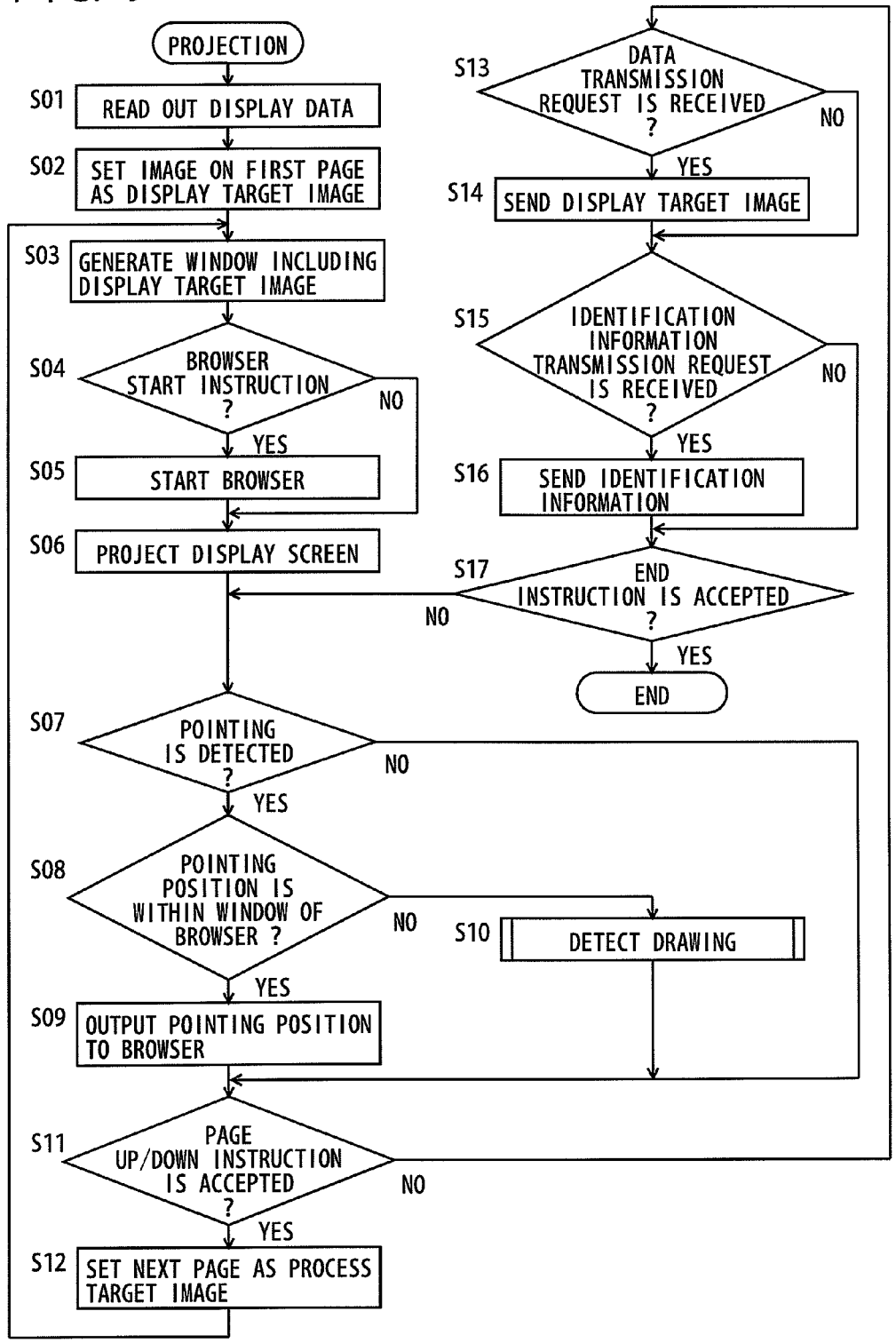
FIG. 9 is a flowchart showing an exemplary flow of a projection process.

FIG. 9 is a flowchart showing an exemplary flow of a projection process. The projection process is executed by CPU 201 by CPU 201 of PC 200 executing a remote control program. Referring to FIG. 9, CPU 201 first reads out display data from HDD 204 (step S01). Then, an image of the first page of page data of the display data is set as a display target image (step S02).

In step S03, a window including the display target image is generated. Then, it is determined whether an instruction for starting a browser is accepted or not (step S04). A start-up instruction is accepted from operation portion 206 or whiteboard 400. If an instruction to start the browser is accepted, the process proceeds to step S05. If not, step S05 is skipped and the process proceeds to step S06. In step S05, the browser is started. Specifically, the browser is started by executing a browsing program. Here, the URL assigned to the menu screen stored in MFP 100 is set as an initial setting value of the browsing program. Therefore, the starting up of the browser causes the menu screen to be received from MFP 100, so that a window including an image of the menu screen is generated.

In the next step S06, the display screen is projected. The display screen is sent to projector 500 to allow projector 500 to project the display screen onto the drawing plane of whiteboard 400. The display screen includes the window including the display target image generated in step S03 and, if step S05 is executed, the window including the image of the operation screen received from MFP 100.

In step S07, it is determined whether pointing is detected or not. Pointing is detected if positional information and identification information are received from whiteboard 400. If pointing is detected, the process proceeds to step S08, and if not, the process proceeds to step S11. In step S08, it is determined whether the pointing position is located within the window including the image generated by the browser in the display screen. If located within the window including the image generated by the browser, the process proceeds to step S09. If not, the process proceeds to step S10. In step S10, a drawing detection process is executed, and the process then proceeds to step S11. The drawing detection process, which will be described later, is a process of detecting the pointing position as a drawing image.

In step S09, the pointing position is output to the browser, and the process proceeds to step S11. The position corresponding to the pointing position in the screen of the browser is output to the task that executes the browsing program. The browser executes a command predetermined for a position in the operation screen that corresponds to the pointing position. For example, if link information is allocated, the Web page of the URL specified by the link information is downloaded.

In step S11, it is determined whether a page down instruction is accepted or not. The page down instruction is accepted from operation portion 206 or whiteboard 400. If the page down instruction is accepted, the process proceeds to step S12. If not, the process proceeds to step S13. In step S12, page data on the next page following the page data set as the display target image, of the display data read out in step S01, is set as a process target image, and the process returns to step S03.

In step S13, it is determined whether a data transmission request is received or not. It is determined whether network I/F 207 receives a data transmission request from MFP 100. If the data transmission request is received, the process proceeds to step S14. If not, step S14 is skipped, and the process proceeds to step S15. In step S14, the page data set as the display target image is sent to MFP 100 through network I/F 207. It is noted that the display data read in step S01 may be sent.

In step S15, it is determined whether an identification information transmission request is received or not. It is determined whether network I/F 207 receives an identification information transmission request from MFP 100. If the identification information transmission request is received, the process proceeds to step S16. If not, step S16 is skipped, and the process proceeds to step S17. In step S16, the identification information received from whiteboard 400 in step S07 is sent to MFP 100 through network I/F 207.

In step S17, it is determined whether an end instruction is accepted or not. The end instruction is accepted from operation portion 206 or whiteboard 400. If the end instruction is accepted, the process ends. If not, the process returns to step S07.

Figure 10:
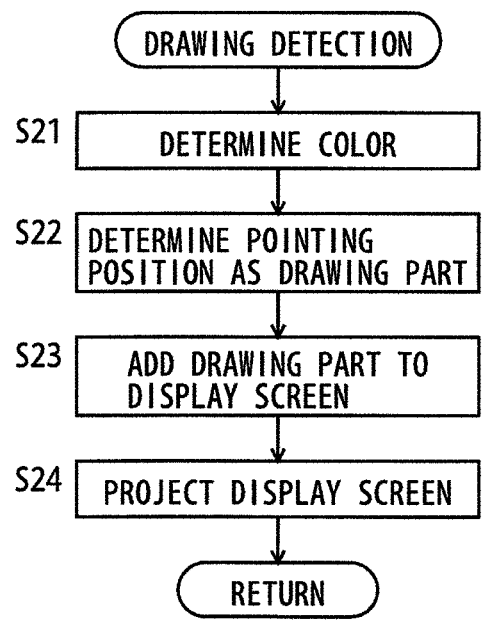
FIG. 10 is a flowchart showing an exemplary flow of a drawing detection process.

FIG. 10 is a flowchart showing an exemplary flow of the drawing detection process. The drawing detection process is a process executed in step S10 in FIG. 9. Referring to FIG. 10, in step S21, a color is determined. In step S07 in FIG. 9, a predetermined color for the identification information received from whiteboard 400 is determined. In the next step S22, a pixel of the display screen corresponding to the pointing position received from whiteboard 400 in step S07 is determined as a drawing part. Then, the drawing part is added to the display screen (step S23). The color of the pixel at the drawing part of the display screen is changed to the color determined in step S21. Then, the display screen in which the drawing part is added is sent to projector 500, allowing projector 500 to project the display screen onto the drawing plane of whiteboard 400 (step S24). The process then returns to the projection process.

Figure 11:
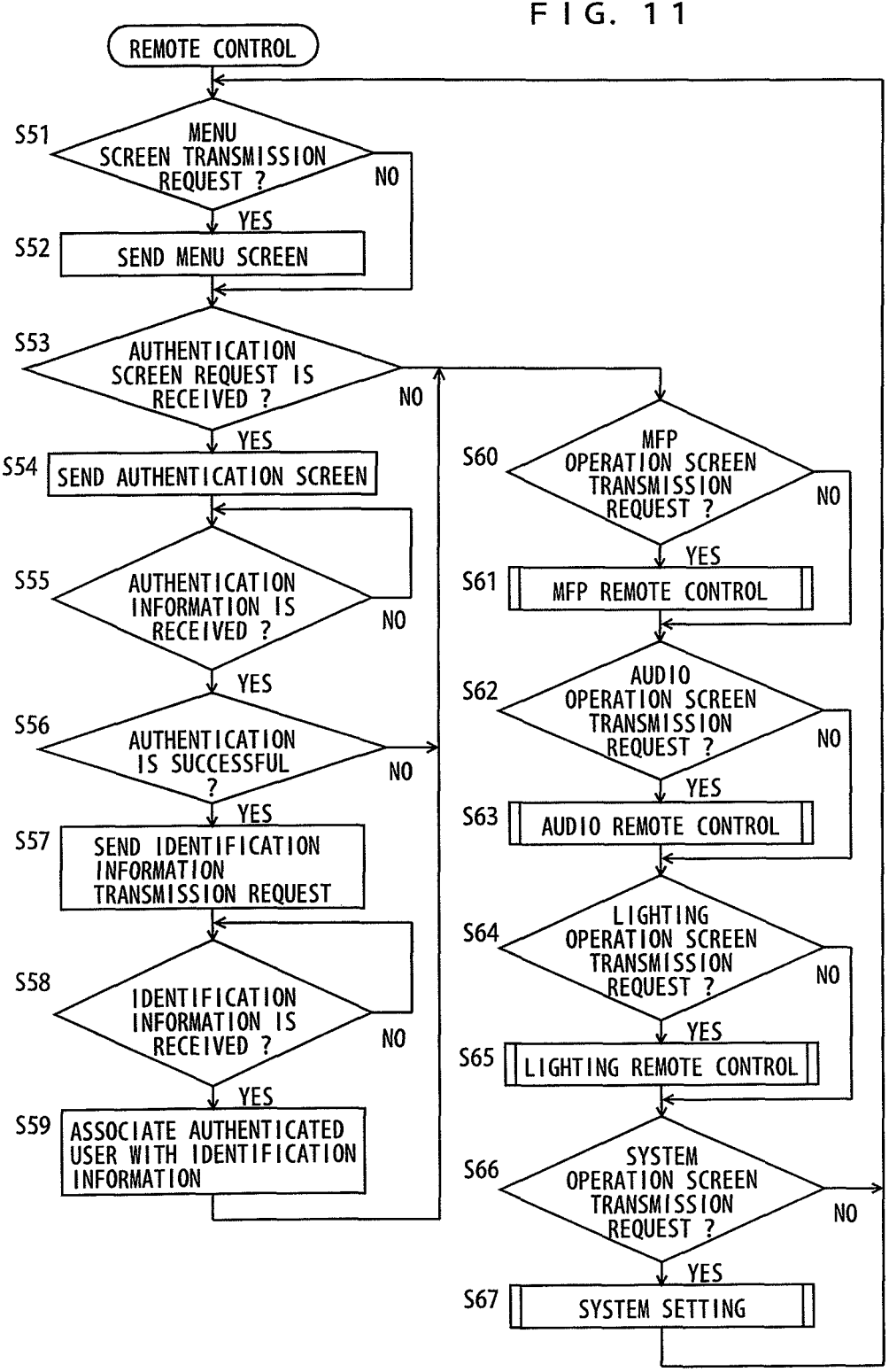
FIG. 11 is a flowchart showing an exemplary flow of a remote control process.

FIG. 11 is a flowchart showing an exemplary flow of a remote control process. The remote control process is a process executed by CPU 111 of MFP 100 executing a remote control program. Referring to FIG. 11, CPU 111 determines whether a transmission request for the menu screen is accepted or not (step S51). It is determined whether network I/F 118 receives a transmission request for the menu screen from PC 200. If the transmission request for the menu screen is received, the process proceeds to step S52. If not, step S52 is skipped, and the process proceeds to step S53. In step S52, the menu screen stored in HDD 116 is sent to PC 200 through network I/F 118. Accordingly, window 423 including the image of the menu screen shown in FIG. 5 is generated in PC 200, and window 423 is projected onto whiteboard 400.

In step S53, it is determined whether a transmission request for the authentication screen is accepted or not. If the button represented by "Log in" included in window 423 including the image of the menu screen shown in FIG. 5 is pointed to by any one of pens 411A-411E, the command included in the menu screen is executed in PC 200, and a transmission request for the authentication screen is sent to MFP 100. In step S53, it is determined whether network I/F 118 receives a transmission request for the authentication screen from PC 200. If the transmission request for the authentication screen is received, the process proceeds to step S54. If not, the process proceeds to step S60. In step S54, the authentication screen stored in HDD 116 is sent to PC 200 through network I/F 118. Accordingly, window 443 including the image of the authentication screen shown in FIG. 8 is generated in PC 200, and window 443 is projected onto whiteboard 400.

In step S55, it is determined whether authentication information is received or not. The authentication information is here an ID and a password. An ID and a password are set in field 444 and field 445, respectively, included in window 443 including the image of the authentication screen shown in FIG. 8. If button 446 is pointed to by any one of pens 411A-411E, the command included in the authentication screen is executed in PC 200, so that the ID and the password are sent to MFP 100. In step S55, the process waits until network I/F 118 receives an ID and a password from PC 200 (NO in step S55). If an ID and a password are received from PC 200 (YES in step S55), the process proceeds to step S56.

In step S56, the user is authenticated based on the ID and password received in step S55, and it is determined whether the authentication is successful or not. For example, user data including an ID and a predetermined password assigned to a user who is permitted to use meeting system 1 is stored in HDD 116, so that a user is authenticated on condition that the user data including the ID and password identical to the ID and password received in step S55 is stored. If the authentication is successful, the process proceeds to step S57. If the authentication is failed, the process proceeds to step S60. If the authentication is failed, a screen including an error message may be sent to PC 200, allowing the error message to be projected onto whiteboard 400.

In step S57, a transmission request for identification information is sent to PC 200 through network I/F 118. If PC 200 receives the transmission request for identification information, then PC 200 sends back the identification information of pens 411A-411E that is received most recently from whiteboard 400. In step S58, the process waits until network I/F 118 receives identification information from PC 200. If identification information is received, the process proceeds to step S59.

In step S59, the ID of the user whose authentication is successful in step S56 is associated with the identification information received in step S58, and the process then proceeds to step S60. Specifically, a pair of the ID and the identification information is temporarily stored in RAM 114.

In step S60, it is determined whether a transmission request for the MFP operation screen is received or not. If the button represented by "MFP" included in window 423 including the image of the menu screen shown in FIG. 5 is pointed to by any one of pens 411A-411E, the command included in the menu screen is executed in PC 200, and a transmission request for the MFP operation screen is sent to MFP 100. In step S60, it is determined whether network I/F 118 receives the transmission request for the MFP operation screen from PC 200. If the transmission request for the MFP operation screen is received, the process proceeds to step S61. If not, step S61 is skipped, and the process proceeds to step S62. In step S61, an MFP remote control process is executed, and the process proceeds to step S62. The MFP remote control process will be described later.

In step S62, it is determined whether a transmission request for the audio operation screen is received or not. If the button represented by "Audio" included in window 423 including the image of the menu screen shown in FIG. 5 is pointed to by any one of pens 411A-411E, the command included in the menu screen is executed in PC 200, and a transmission request for the audio operation screen is sent to MFP 100. In step S62, it is determined whether network I/F 118 receives the transmission request for the audio operation screen from PC 200. If the transmission request for the audio operation screen is received, the process proceeds to step S63. If not, step S63 is skipped, and the process proceeds to step S64. In step S63, an audio remote control process is executed, and the process proceeds to step S64. The audio remote control process will be described later.

In step S64, it is determined whether a transmission request for the lighting operation screen is received or not. If the button represented by "Lighting" included in window 423 including the image of the menu screen shown in FIG. 5 is pointed to by any one of pens 411A-411E, the command included in the menu screen is executed in PC 200, and a transmission request for the lighting operation screen is sent to MFP 100. In step S64, it is determined whether network I/F 118 receives the transmission request for the lighting operation screen from PC 200. If the transmission request for the lighting operation screen is received, the process proceeds to step S65. If not, step S65 is skipped, and the process proceeds to step S66. In step S65, a lighting remote control process is executed, and the process proceeds to step S66. The lighting remote control process will be described later.

In step S66, it is determined whether a transmission request for the system operation screen is received or not. If the button represented by "System" included in window 423 including the image of the menu screen shown in FIG. 5 is pointed to by any one of pens 411A-411E, the command included in the menu screen is executed in PC 200, and a transmission request for the system operation screen is sent to MFP 100. In step S66, it is determined whether network I/F 118 receives the transmission request for the system operation screen from PC 200. If the transmission request for the system operation screen is received, the process proceeds to step S67. If not, step S67 is skipped, and the process returns to step S51. In step S67, a system setting process is executed, and the process returns to step S51. The system setting process will be described later.

Figure 12:
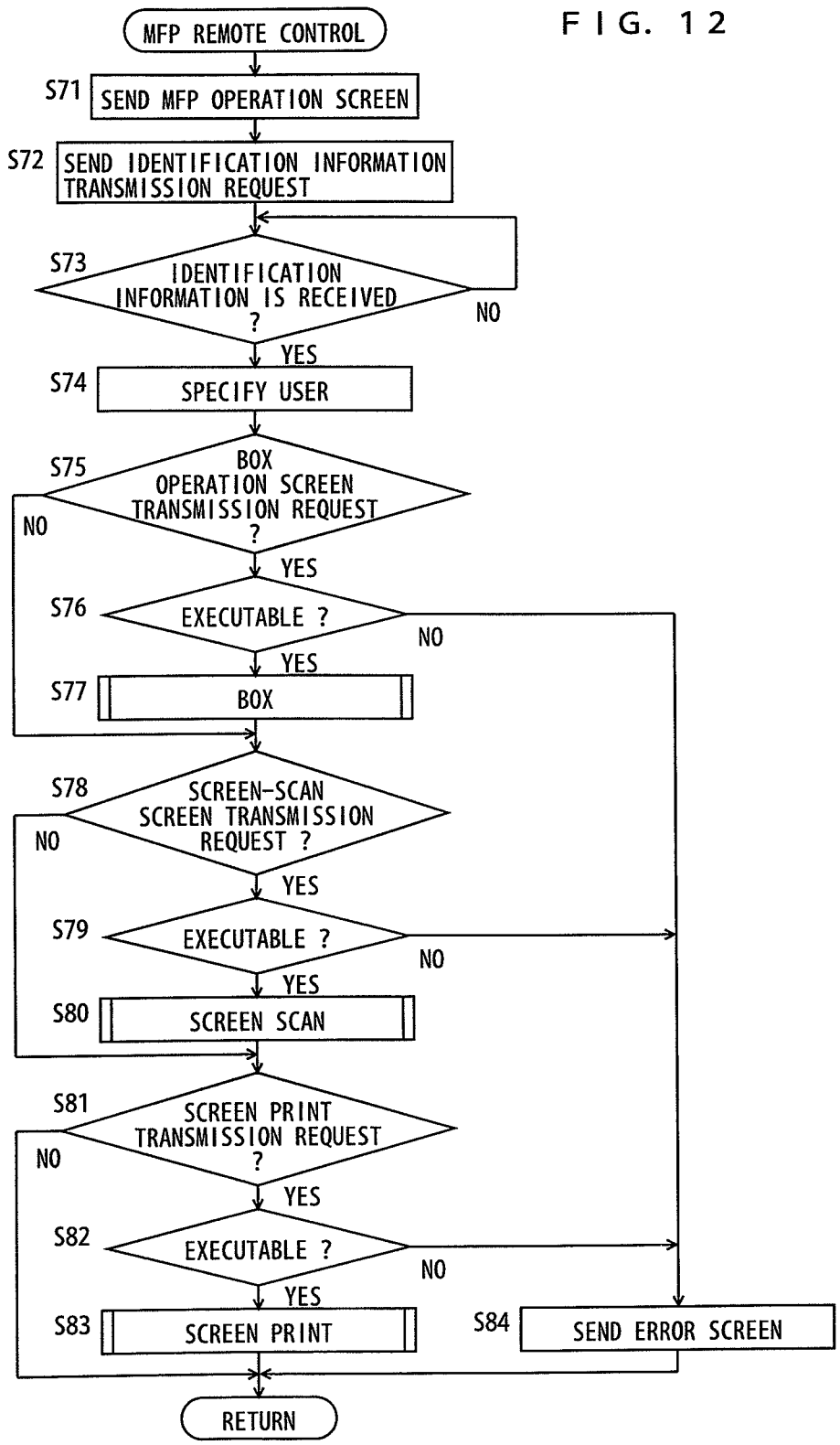
FIG. 12 is a flowchart showing an exemplary flow of an MFP remote control process.

FIG. 12 is a flowchart showing an exemplary flow of the MFP remote control process. The MFP remote control process is a process executed in step S61 in the remote control process shown in FIG. 11. Referring to FIG. 12, in step S71, the MFP operation screen is sent to PC 200 through network I/F 118. The MFP operation screen is a device's own operation screen for accepting an operation for controlling MFP 100.

Figure 13:
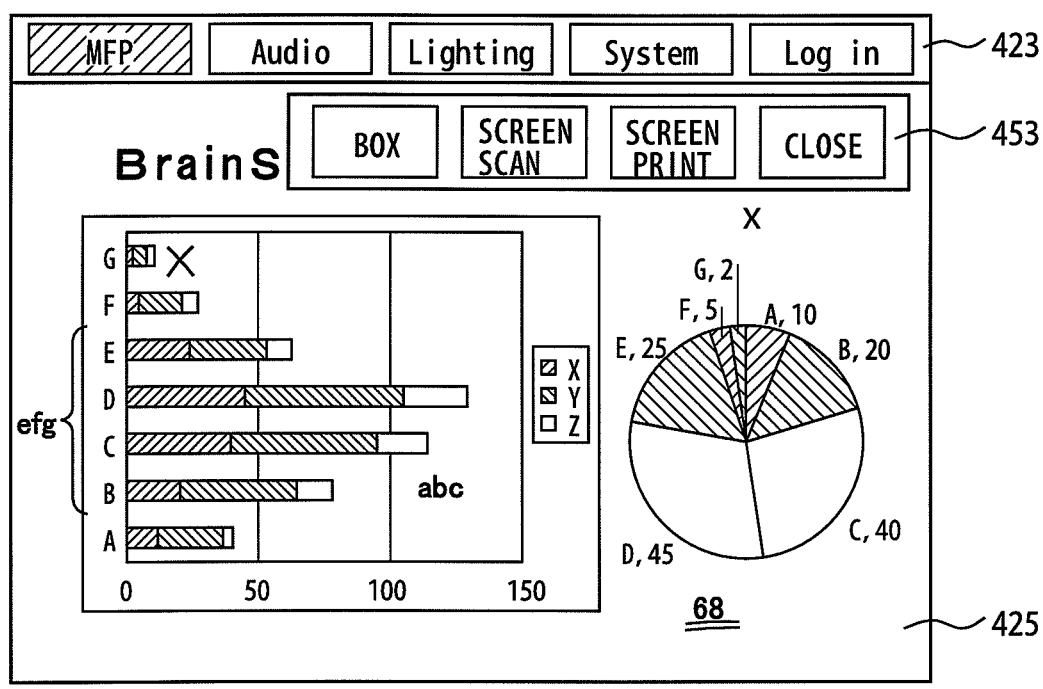
FIG. 13 is an illustration showing an exemplary window including an image of an MFP operation screen.

FIG. 13 is an illustration showing an exemplary window including an image of the MFP operation screen. FIG. 13 shows a display screen which appears after the MFP operation screen is received in a state in which display screen 421 shown in FIG. 5 is displayed. Referring to FIG. 13, a window 453 including the image of the MFP operation screen is superimposed on window 425 including the image of page data.

Window 453 includes a button represented by "BOX," a button represented by "Screen Scan," a button represented by "Screen Print," and a button represented by "Close," which are selectable. The MFP operation screen includes a command to transmit a transmission request for a BOX selection screen in relation to the button represented by "BOX," a command to transmit a transmission request for a screen-scan screen in relation to the button represented by "Screen Scan," a command to transmit a transmission request for a screen-print screen in relation to the button represented by "Screen Print," and a command to close the MFP operation screen in relation to the button represented by "Close."

Returning to FIG. 12, in step S72, a transmission request for identification information is sent to PC 200 through network I/F 118. If PC 200 receives the transmission request for identification information, PC 200 sends back the identification information of pens 411A-411E that is received most recently from whiteboard 400, here, the identification information (pen No.) of the pen that points to the button represented by "MFP" included in the window including the image of the menu screen. In step S73, the process waits until network I/F 118 receives the identification information from PC 200. If the identification information is received, the process proceeds to step S74.

In step S74, the user who gives an instruction to send the MFP operation screen is specified. Specifically, the ID associated with the identification information received in step S73 is obtained.

In the next step S75, it is determined whether a transmission request for the BOX operation screen is received or not. If network I/F 118 receives a transmission request for the BOX operation screen from PC 200, the process proceeds to step S76. If not, the process proceeds to step S78. In step S76, it is determined whether the user specified in step S74 has the authority to execute a process concerning a BOX operation. Specifically, a restriction table in which whether a process is executable or not is defined for each user is stored beforehand in HDD 116, so that whether execution is permitted or not is determined by referring to the restriction table. The restriction table is a table in which whether execution is permitted to an ID is defined for each process.

It is determined whether a process concerning a BOX operation is set to be executable in the restriction table, for the ID obtained in step S74. If it is set to be executable, the process proceeds to step S77. If not, the process proceeds to step S84. In step S84, a Web page including an error screen is sent to PC 200, and the process returns to the remote control process. Accordingly, a window including the image of the error screen is generated by PC 200, and the image of the error screen is projected onto the drawing plane of whiteboard 400. On the other hand, in step S77, a BOX process is executed, and the process then proceeds to step S78. The BOX process will be described later.

In the next step S78, it is determined whether a transmission request for the screen-scan screen is received or not. If network I/F 118 receives a transmission request for the screen-scan screen from PC 200, the process proceeds to step S79. If not, the process proceeds to step S81. In step S79, it is determined whether the user specified in step S74 has the authority to execute a process concerning screen scan. Specifically, it is determined whether a process concerning screen scan is set to be executable in the restriction table, for the ID obtained in step S74. If it is set to be executable, the process proceeds to step S80. If not, the process proceeds to step S84. In step S84, a Web page including an error screen is sent to PC 200, and the process then returns to the remote control process. On the other hand, in step S80, a screen scan process is executed, and the process proceeds to step S81. The screen scan process will be described later.

In the next step S81, it is determined whether a transmission request for the screen-print screen is received or not. If network I/F 118 receives a transmission request for the screen-print screen from PC 200, the process proceeds to step S82. If not, the process returns to the remote control process. In step S82, it is determined whether the user specified in step S74 has the authority to execute a process concerning screen print. Specifically, it is determined whether a process concerning screen print is set to be executable in the restriction table, for the ID obtained in step S74. If it is set to be executable, the process proceeds to step S83. If not, the process proceeds to step S84. In step S84, a Web page including an error screen is sent to PC 200, and the process then returns to the remote control process. On the other hand, in step S83, a screen print process is executed, and the process returns to the remote control process. The screen print process will be described later.

Figure 14A:
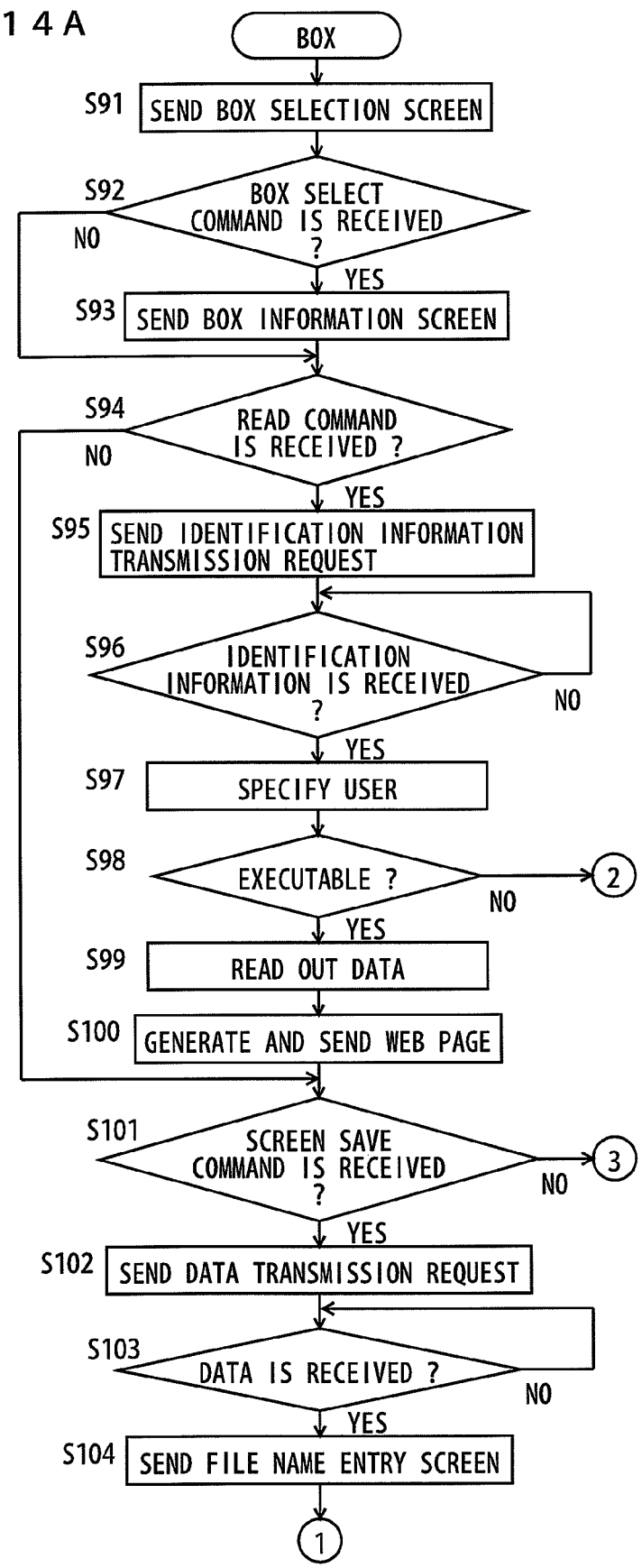
FIGS. 14A and 14B are flowcharts each showing an exemplary flow of a BOX process.
Figure 14B:
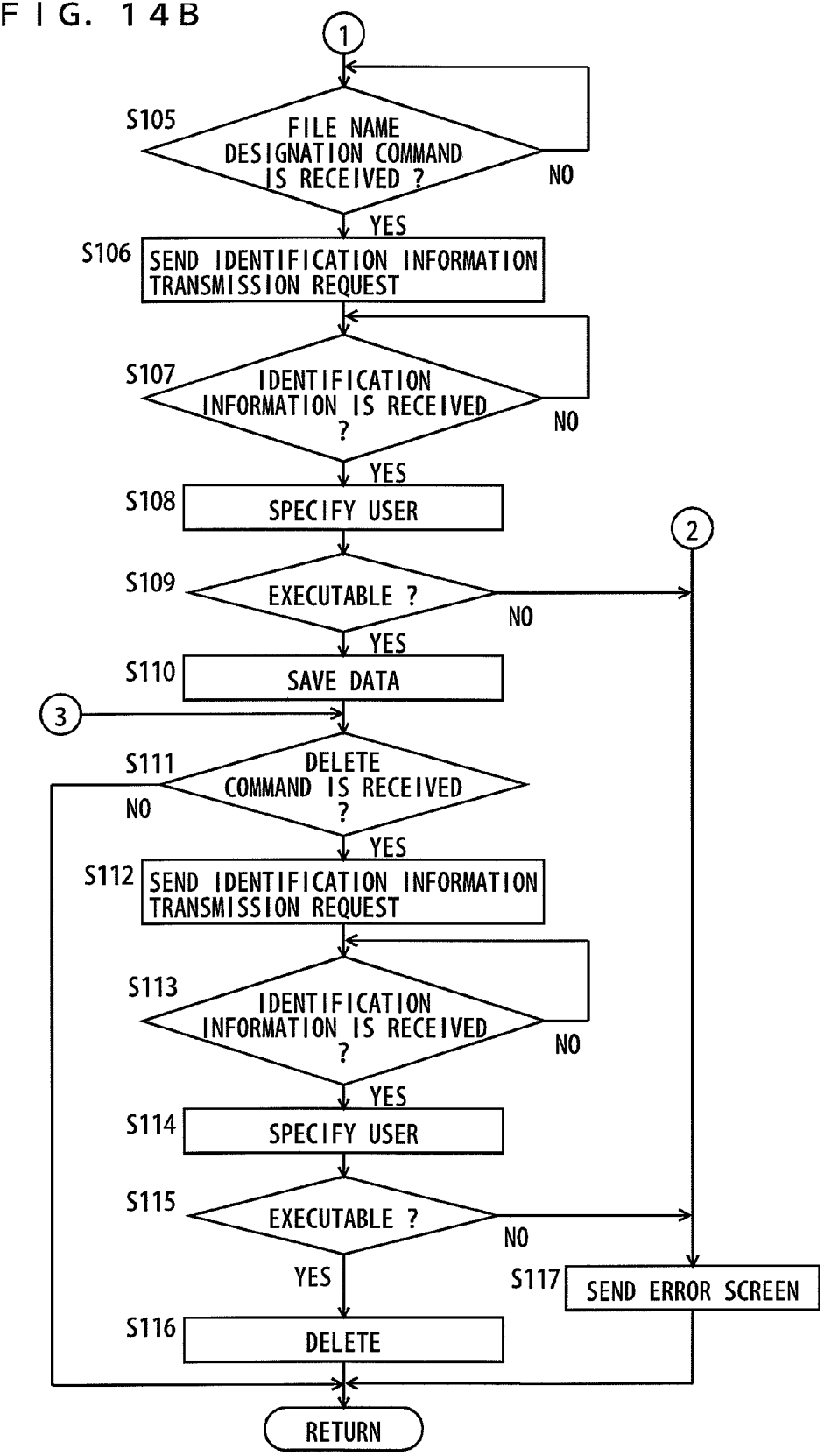

FIGS. 14A and 14B are flowcharts each showing an exemplary flow of the BOX process. The BOX process is a process executed in step S77 of the MFP remote control process shown in FIG. 12. Referring to FIGS. 14A and 14B, in step S91, a BOX selection screen is sent. The BOX selection screen, which will be described later, is a Web page for selecting a BOX, which is a storage region of HDD 116 of MFP 100, and includes a command to transmit a BOX select command including a BOX name which specifies the selected BOX.

In the next step S92, it is determined whether network I/F 118 receives the BOX select command from PC 200. If the BOX select command is received, the process proceeds to step S93. If not, step S93 is skipped, and the process proceeds to step S94. In step S93, a BOX information screen is sent, and the process then proceeds to step S94. The BOX information screen, which will be described later, includes a list of file names of data stored in the BOX specified by the BOX name received together with the BOX select command.

Figure 15:
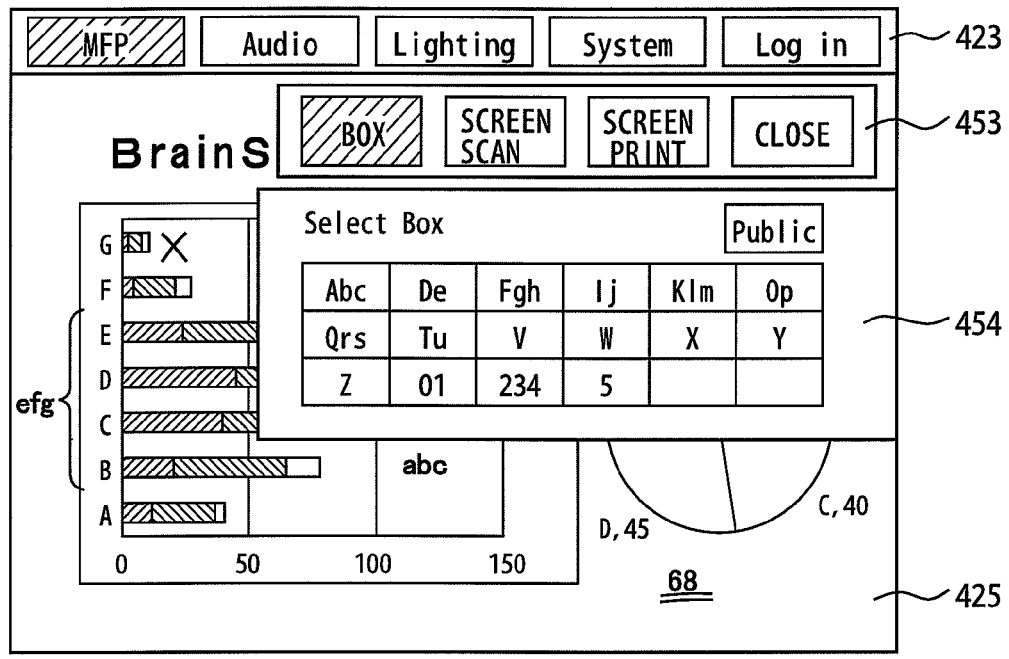
FIG. 15 is an illustration showing an exemplary window including an image of a BOX selection screen.

FIG. 15 is an illustration showing an exemplary window including an image of the BOX selection screen. FIG. 15 shows a display screen which appears after the button represented by "BOX" is pointed to and the BOX selection screen is received in a state in which display screen 451 shown in FIG. 13 is displayed. Referring to FIG. 15, window 453 including the image of the MFP operation screen and a window 454 including an image of the BOX selection screen are superimposed on window 425 including the image of page data. In window 454, BOX names are listed. Here, a BOX refers to a storage region included in HDD 116 of MFP 100, and a BOX name refers to the name given to a BOX.

In the BOX selection screen, each of the BOX names listed in window 454 is related to a command including the corresponding BOX name to transmit a transmission request for the BOX information screen. If, for example, the user who uses pen 411A points to one of the BOX names listed in window 454 with pen 411A, PC 200 executes a command corresponding to the pointing position and sends a BOX select command including the BOX name to MFP 100.

Figure 16:
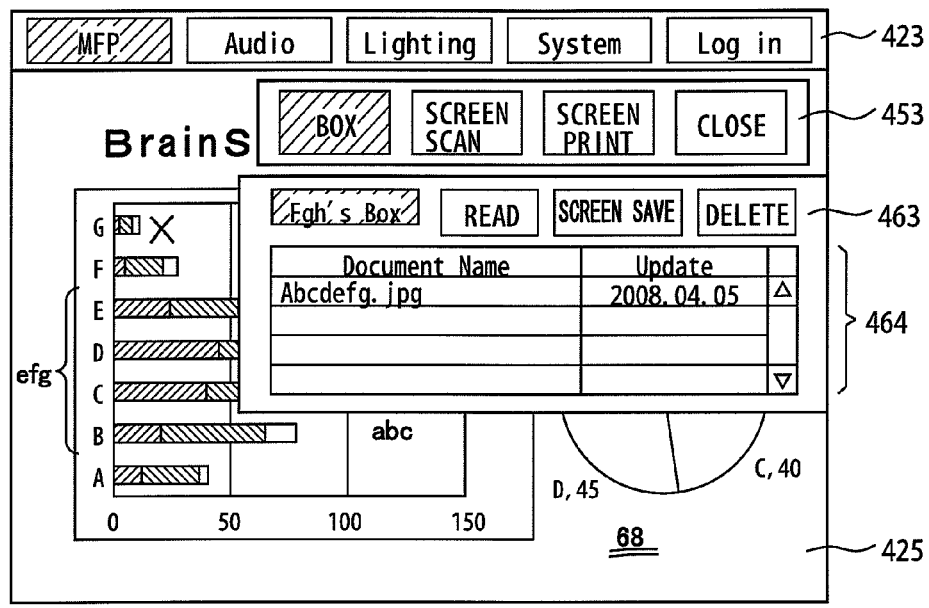
FIG. 16 is an illustration showing an exemplary window including an image of a BOX information screen.

FIG. 16 is an illustration showing an exemplary window of the image of the BOX information screen. FIG. 16 shows a display screen which appears after the button represented by the BOX name "Fgh" is pointed to and the BOX information screen is received in a state in which display screen 451 shown in FIG. 15 is displayed. Referring to FIG. 16, a display screen 461 displays window 453 including the image of the MFP operation screen and a window 463 including the image of the BOX information screen, which are superimposed on window 425 including the image of page data. Window 463 includes a button represented by "Read," a button represented by "Screen Save," a button represented by "Delete," and a field 464 in which the file names of data saved in the BOX name "Fgh" are listed. The displayed file names listed in field 464 are selectable. In the BOX information screen, a read command is related to the button represented by "Read," and a command to execute a process of transmitting the file name selected in field 464 and the read command is additionally related to the button represented by "Read," if it is pointed to. In the BOX information screen, a screen save command is related to the button represented by "Screen Save," and a command to execute a process of transmitting the file name selected in field 464 and the screen save command is additionally related to the button represented by Screen Save," if it is pointed to. Furthermore, in the BOX information screen, a delete command is related to the button represented by "Delete," and a command to execute a process of transmitting the file name selected in field 464 and the delete command is additionally related to the button represented by "Delete," if it is pointed to.

Returning to FIGS. 14A and 14B, in step S94, it is determined whether network I/F 118 receives the read command from PC 200. If the read command is received, the process proceeds to step S95. If not, the process proceeds to step S101. In step S95, a transmission request for identification information is sent to PC 200 through network I/F 118. Upon receiving the transmission request for identification information, PC 200 sends back the identification information of pens 411A-411E that is received most recently from whiteboard 400, here, the identification information (pen No.) of the pen that points to the button represented by "Read" included in window 463 including the image of the BOX information screen shown in FIG. 16. In step S96, the process waits until network I/F 118 receives the identification information from PC 200. If the identification information is received, the process proceeds to step S97.

In step S97, the user who gives an instruction to send the read command is specified. Specifically, the ID associated with the identification information received in step S96 is obtained.

In the next step S98, it is determined whether the user specified in step S97 has the authority to execute a read process. Specifically, it is determined whether a read process is set to be executable in the restriction table, for the ID obtained in step S97. If it is set to be executable, the process proceeds to step S99. If not, the process proceeds to step S117. In step S117, a Web page including an error screen is sent to PC 200, and the process returns to the MFP remote control process. Accordingly, a window including the image of the error screen is generated by PC 200, and the image of the error screen is projected onto the drawing plane of whiteboard 400.

On the other hand, in step S99, the data with the file name received together with the read command in step S94 is read out from HDD 116. Then, a Web page including the image of the read data is generated and sent to PC 200 (step S100). Upon receiving the Web page, PC 200 generates a window including the image of the data read from HDD 116 and allows projector 500 to project the image onto the drawing plane of whiteboard 400. Accordingly, the user can allow the image of the data stored in HDD 116 of MFP 100 to be projected onto whiteboard 400, through an operation of pointing at whiteboard 400.

In step S101, it is determined whether network I/F 118 receives the screen save command from PC 200. If the screen save command is received, the process proceeds to step S102. If not, the process proceeds to step S111. In step S102, a data transmission request is sent to PC 200 through network I/F 118. Upon receiving the data transmission request, PC 200 sends back display data 231 to be displayed by projector 500, to MFP 100. In step S103, the process waits until network I/F 118 receives display data 231 from PC 200, and if display data 231 is received, the process proceeds to step S104. In step S104, a file name entry screen is sent to PC 200.

Figure 17:
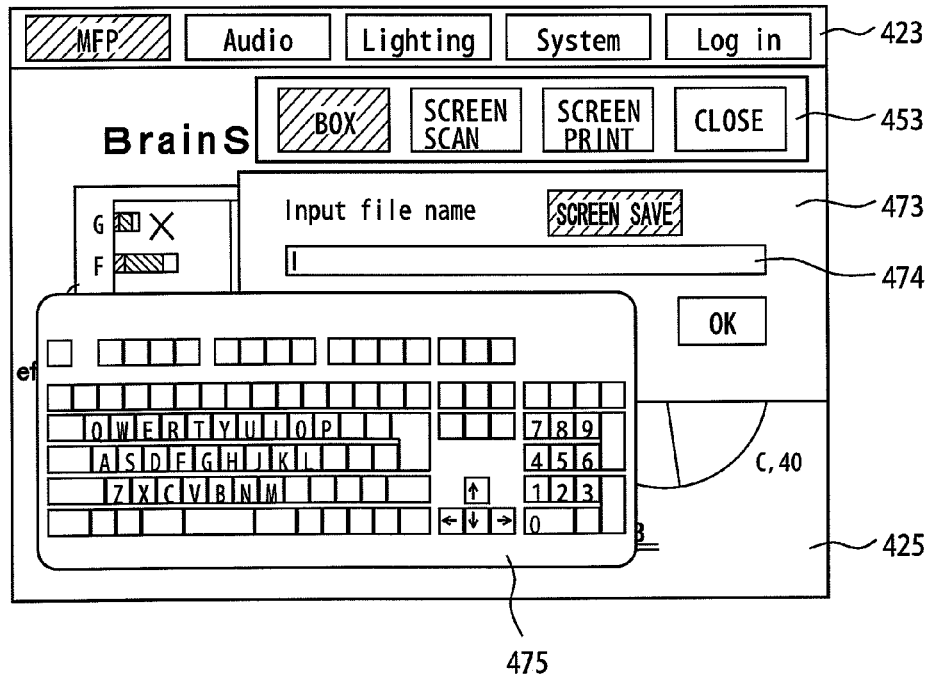
FIG. 17 is an illustration showing an exemplary window including an image of a file name entry screen.

FIG. 17 is an illustration showing an exemplary window including an image of the file name entry screen. The file name entry screen includes an image of a file name entry screen and an image of a keyboard. FIG. 17 shows a display screen 471 which appears after the file name entry screen is received in a state in which display screen 461 shown in FIG. 16 is displayed. Referring to FIG. 17, a window 473 including an image of the file name entry screen and a window 475 including an image of a keyboard are superimposed on window 425 including the image of page data. Window 473 includes a field 474 in which a file name is set and a button represented by "OK."

When, for example, the user who uses pen 411A points to field 474 with pen 411A and thereafter each time the user points to an alphanumeric key in window 475, PC 200 sets a character corresponding to the pointing position in field 474. Accordingly, the user can set a file name in field 474. Then, if the user points to the inside of the button represented by "OK" with pen 411A, then PC 200 executes a command related to the characters "OK" to send the file name set in field 474 and a file name designation command to MFP 100.

Returning to FIGS. 14A and 14B, in step S105, the process waits until network I/F 118 receives the file name designation command from PC 200, and if the file name designation command is received, the process proceeds to step S106.

In step S106, a transmission request for identification information is sent to PC 200 through network I/F 118. Upon receiving the transmission request for identification information, PC 200 sends back the identification information of pens 411A-411E that is received most recently from whiteboard 400, here, the identification information (pen No.) of the pen that points to the button represented by "OK" included in window 473 including the image of the file name entry screen shown in FIG. 17. In step S107, the process waits until network I/F 118 receives the identification information from PC 200, and if the identification information is received, the process proceeds to step S108.

In step S108, the user who gives an instruction to send the file name designation command is specified. Specifically, the ID associated with the identification information received in step S107 is obtained.

In the next step S109, it is determined whether the user specified in step S108 has the authority to execute a saving process. Specifically, it is determined whether the saving process is set to be executable in the restriction table, for the ID obtained in step S108. If it is set to be executable, the process proceeds to step S110. If not, the process proceeds to step S117. In step S117, a Web page including an error screen is sent to PC 200, and the process then returns to the MFP remote control process. Accordingly, a window including an image of an error screen is generated by PC 200, and the image of the error screen is projected onto the drawing plane of whiteboard 400.

On the other hand, in step S110, the data received in step S103 is given the file name received together with the file name designation command in step S105 and is then saved in the BOX selected in step S92. The user can store the data of the image projected on whiteboard 400 into HDD 116 of MFP 100, through an operation of pointing at whiteboard 400.

In step S111, it is determined whether network I/F 118 receives the delete command from PC 200. If the delete command is received, the process proceeds to step S112. If not, the process returns to the MFP remote control process. In step S112, a transmission request for identification information is sent to PC 200 through network I/F 118. Upon receiving the transmission request for identification information, PC 200 sends back the identification information of pens 411A-411E that is received most recently from whiteboard 400, here, the identification information (pen No.) of the pen that points to the button represented by "Delete" included in window 463 including the image of the BOX information screen shown in FIG. 16. In step S113, the process waits until network I/F 118 receives the identification information from PC 200, and if the identification information is received, the process proceeds to step S114.

In step S114, the user who gives an instruction to send the delete command is specified. Specifically, the ID associated with the identification information received in step S113 is obtained.

In the next step S115, it is determined whether the user specified in step S114 has the authority to execute a delete process. Specifically, it is determined whether the delete process is set to be executable in the restriction table, for the ID obtained in step S114. If it is set to be executable, the process proceeds to step S116. If not, the process proceeds to step S117. In step S117, a Web page including an error screen is sent to PC 200, and the process then returns to the MFP remote control process. Accordingly, a window including the image of the error screen is generated by PC 200, and the image of the error screen is projected onto the drawing plane of whiteboard 400.

On the other hand, in step S116, the data with the file name received together with the delete command in step S111 is deleted from HDD 116. Accordingly, the user can delete the data stored in HDD 116 of MFP 100, through an operation of pointing at whiteboard 400.

Figure 18A:
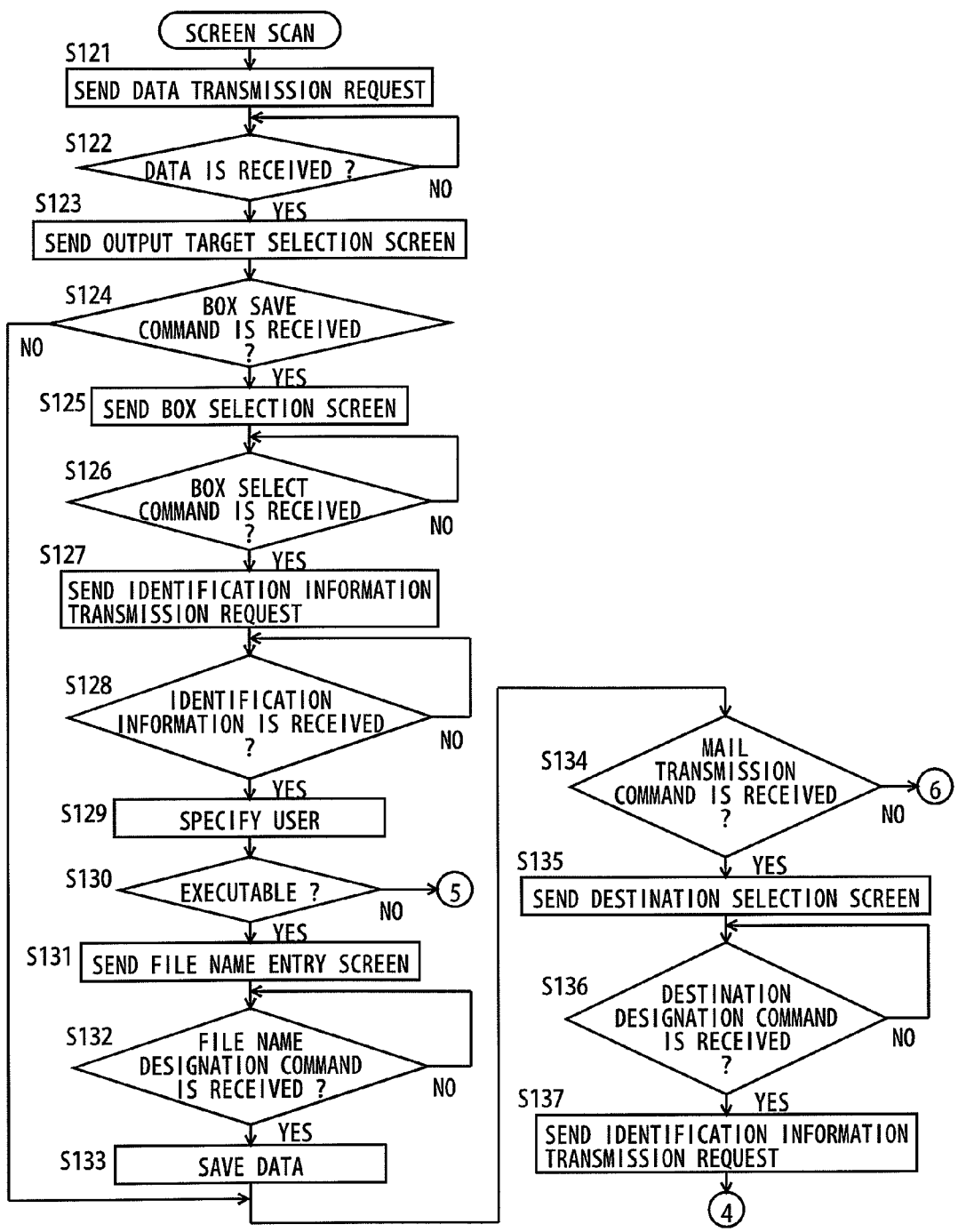
FIGS. 18A and 18B are flowcharts each showing an exemplary flow of a screen scan process.
Figure 18B:
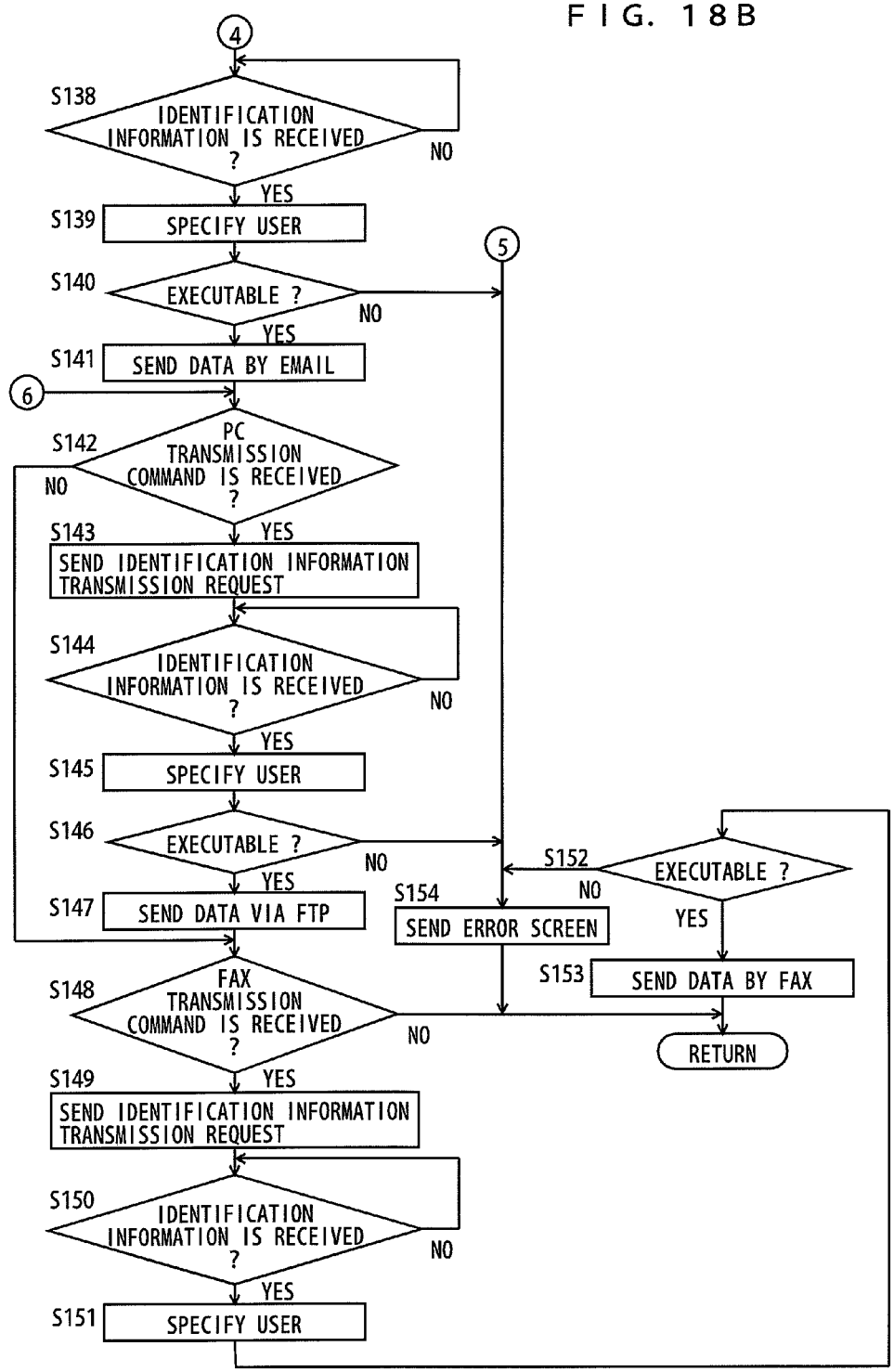

FIGS. 18A and 18B are flowcharts each showing an exemplary flow of the screen scan process. The screen scan process is a process executed in step S80 of the MFP remote control process shown in FIG. 12. Referring to FIGS. 18A and 18B, in step S121, a data transmission request is sent to PC 200 through network I/F 118. Upon receiving the data transmission request, PC 200 sends back display data 231 to be displayed by projector 500, to MFP 100. In step S122, the process waits until network I/F 118 receives display data 231 from PC 200, and if display data 231 is received, the process proceeds to step S123. In step S123, an output target selection screen is sent to PC 200. The output target selection screen is one of the device's own operation screens.

Figure 19:
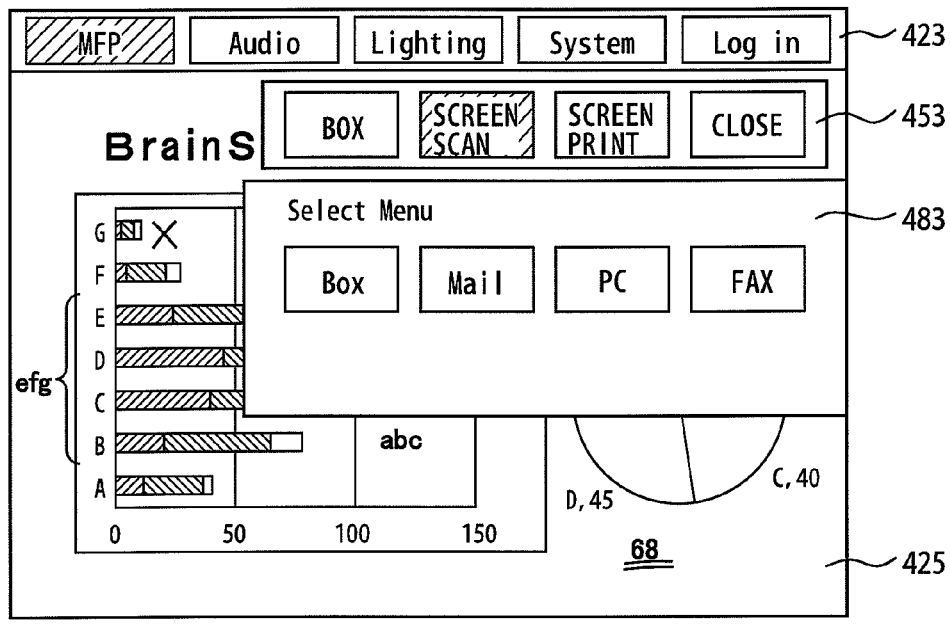
FIG. 19 is an illustration showing an exemplary window including an image of an output target selection screen.

FIG. 19 is an illustration showing an exemplary window including an image of the output target selection screen. FIG. 19 shows a display screen which appears after the output target selection screen is received in a state in which display screen 451 shown in FIG. 13 is displayed. Referring to FIG. 19, a display screen 481 displays a window 483 including an image of the output target selection screen, which is superimposed on window 425 including the image of page data.

Window 483 includes a button represented by "BOX," a button represented by "Mail," a button represented by "PC," and a button represented by "FAX," which are selectable. The output target selection screen includes a command to transmit a BOX save command in relation to the button represented by "BOX," a command to transmit a transmission request for a destination selection screen in relation to the button represented by "Mail," a command to transmit a PC transmission command in relation to the button represented by "PC," and a command to transmit a FAX transmission command in relation to the button represented by "FAX."

Returning to FIGS. 18A and 18B, in step S124, it is determined whether network I/F 118 receives the BOX save command from PC 200. If the BOX save command is received, the process proceeds to step S125. If not, the process proceeds to step S134. In step S125, the BOX selection screen is sent. The BOX selection screen shown in FIG. 15 is sent. In the next step S126, it is determined whether network I/F 118 receives the BOX select command from PC 200. The process waits until the BOX select command is received, and if the BOX select command is received, the process proceeds to step S127.

In step S127, a transmission request for identification information is sent to PC 200 through network I/F 118. Upon receiving the transmission request for identification information, PC 200 sends back the identification information of pens 411A-411E that is received most recently from whiteboard 400, here, the identification information (pen No.) of the pen that points to one of the BOX names listed in window 454 including the image of the BOX selection screen shown in FIG. 15. In step S128, the process waits until network I/F 118 receives the identification information from PC 200, and if the identification information is received, the process proceeds to step S129.

In step S129, the user who give an instruction to send the BOX select command is specified. Specifically, the ID associated with the identification information received in step S128 is obtained.

In the next step S130, it is determined whether the user specified in step S129 has the authority to execute a saving process. Specifically, it is determined whether the saving process is set to be executable in the restriction table, for the ID obtained in step S129. If it is set to be executable, the process proceeds to step S131. If not, the process proceeds to step S154. In step S154, a Web page including an error screen is sent to PC 200, and the process then returns to the MFP remote control process. Accordingly, a window including the image of the error screen is generated by PC 200, and the image of the error screen is projected onto the drawing plane of whiteboard 400.

On the other hand, in step S131, the file name entry screen shown in FIG. 17 is sent to PC 200. In the next step S132, the process waits until network I/F 118 receives the file name designation command from PC 200, and if the file name designation command is received, the process proceeds to step S133. In step S133, the data received in step S122 is given the file name received together with the file name designation command in step S132 and is then saved in the BOX selected in step S126. The user can store the data of the image projected on whiteboard 400 into HDD 116 of MFP 100, through an operation of pointing at whiteboard 400.

In step S134, it is determined whether network I/F 118 receives the mail transmission command from PC 200. If the mail transmission command is received, the process proceeds to step S135. If not, the process proceeds to step S142. In step S135, the destination selection screen is sent to PC 200 through network I/F 118.

Figure 20:
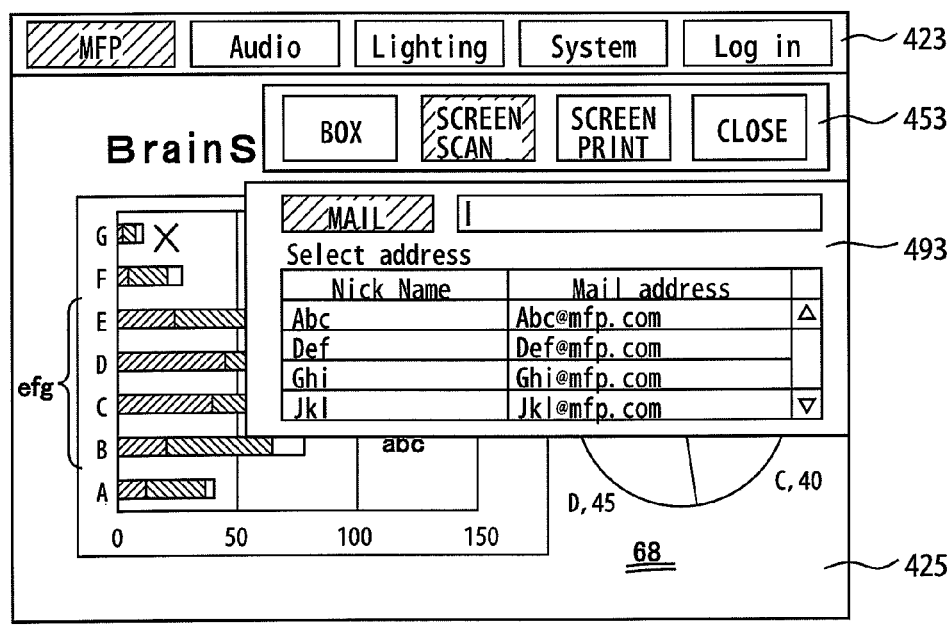
FIG. 20 is an illustration showing an exemplary window including an image of a destination selection screen.

FIG. 20 is an illustration showing an exemplary window including an image of the destination selection screen. FIG. 20 shows a display screen 491 which appears after the destination selection screen is received in a state in which display screen 481 shown in FIG. 19 is displayed. Referring to FIG. 20, display screen 491 displays a window 493 including an image of the destination selection screen, which is superimposed on window 425 including the image of page data. Window 493 shows a list of email addresses stored beforehand in HDD 116. In the destination selection screen, the names of the email addresses listed in window 493 are each related to a corresponding email address and a command to transmit a destination designation command. When, for example, the user who uses pen 411A points to one of the email addresses listed in window 493 with pen 411A, PC 200 executes the command corresponding to the pointing position and sends the destination designation command including the email address to MFP 100.

Returning to FIGS. 18A and 18B, in step S136, it is determined whether network I/F 118 receives the destination designation command from PC 200. The process waits until the destination designation command is received, and if the destination designation command is received, the process proceeds to step S137.

In step S137, a transmission request for identification information is sent to PC 200 through network I/F 118. Upon receiving the transmission request for identification information, PC 200 sends back the identification information of pens 411A-411E that is received most recently from whiteboard 400, here, the identification information (pen No.) of the pen that points to one of the email addresses listed in window 493 including the image of the destination selection screen shown in FIG. 20. In step S138, the process waits until network I/F 118 receives the identification information from PC 200, and if the identification information is received, the process proceeds to step S139.

In step S139, the user who gives an instruction to send the destination designation command is specified. Specifically, the ID associated with the identification information received in step S138 is obtained.

In the next step S140, it is determined whether the user specified in step S139 has the authority to execute an email transmission process. Specifically, it is determined whether the email transmission process is set to be executable in the restriction table, for the ID obtained in step S139. If it is set to be executable, the process proceeds to step S141. If not, the process proceeds to step S154.

On the other hand, in step S141, an email including the data received in step S122 is generated and sent to the destination at the email address received together with the destination designation command in step S136. The user can send the data of the image projected on whiteboard 400 via email, through an operation of pointing at whiteboard 400.

In step S142, it is determined whether network I/F 118 receives the PC transmission command from PC 200. If the PC transmission command is received, the process proceeds to step S143. If not, the process proceeds to step S148. In step S143, a transmission request for identification information is sent to PC 200 through network I/F 118. Upon receiving the transmission request for identification information, PC 200 sends back the identification information of pens 411A-411E that is received most recently from whiteboard 400, here, the identification information (pen No.) of the pen that points to the button represented by "PC" included in window 483 including the image of the output target selection screen shown in FIG. 19. In step S144, the process waits until network I/F 118 receives the identification information from PC 200, and if the identification information is received, the process proceeds to step S145.

In step S145, the user who gives an instruction to send the PC transmission command is specified. Specifically, the ID associated with the identification information received in step S144 is obtained.

In the next step S146, it is determined whether the user specified in step S145 has the authority to execute a PC transmission process. Specifically, it is determined whether the PC transmission process is set to be executable in the restriction table, for the ID obtained in step S145. If it is set to be executable, the process proceeds to step S147. If not, the process proceeds to step S154.

On the other hand, in step S147, the data received in step S122 is sent to a PC specified by a predetermined IP address via File Transfer Protocol (FTP). In this way, the user can send the data of the image projected on whiteboard 400 to a PC via FTP, through an operation of pointing at whiteboard 400. It is noted that the IP address of PC may be selected from IP addresses stored beforehand in HDD 116, or the IP address of PC may be entered directly.

In step S148, it is determined whether network I/F 118 receives the FAX transmission command from PC 200. If the FAX transmission command is received, the process proceeds to step S149. If not, the process returns to the MFP remote control process. In step S149, a transmission request for identification information is sent to PC 200 through network I/F 118. Upon receiving the transmission request for identification information, PC 200 sends back the identification information of pens 411A-411E that is received most recently from whiteboard 400, here, the identification information (pen No.) of the pen that points to the button represented by "FAX" included in window 483 including the image of the output target selection screen shown in FIG. 19. In step S150, the process waits until network I/F 118 receives the identification information from PC 200, and if the identification information is received, the process proceeds to step S151.

In step S151, the user who gives an instruction to send the FAX transmission command is specified. Specifically, the ID associated with the identification information received in step S150 is obtained.

In the next step S151, it is determined whether the user specified in step S150 has the authority to execute a FAX transmission process. Specifically, it is determined whether the FAX transmission process is set to be executable in the restriction table, for the ID obtained in step S151. If it is set to be executable, the process proceeds to step S153. If not, the process proceeds to step S154.

In step S153, the data received in step S122 is faxed to a predetermined facsimile number. In this manner, the user can send the data of the image projected on whiteboard 400 by fax, through an operation of pointing at whiteboard 400. It is noted that the facsimile number may be selected from a plurality of facsimile numbers stored beforehand in HDD 116, or the facsimile number may be entered directly.

Figure 21A:
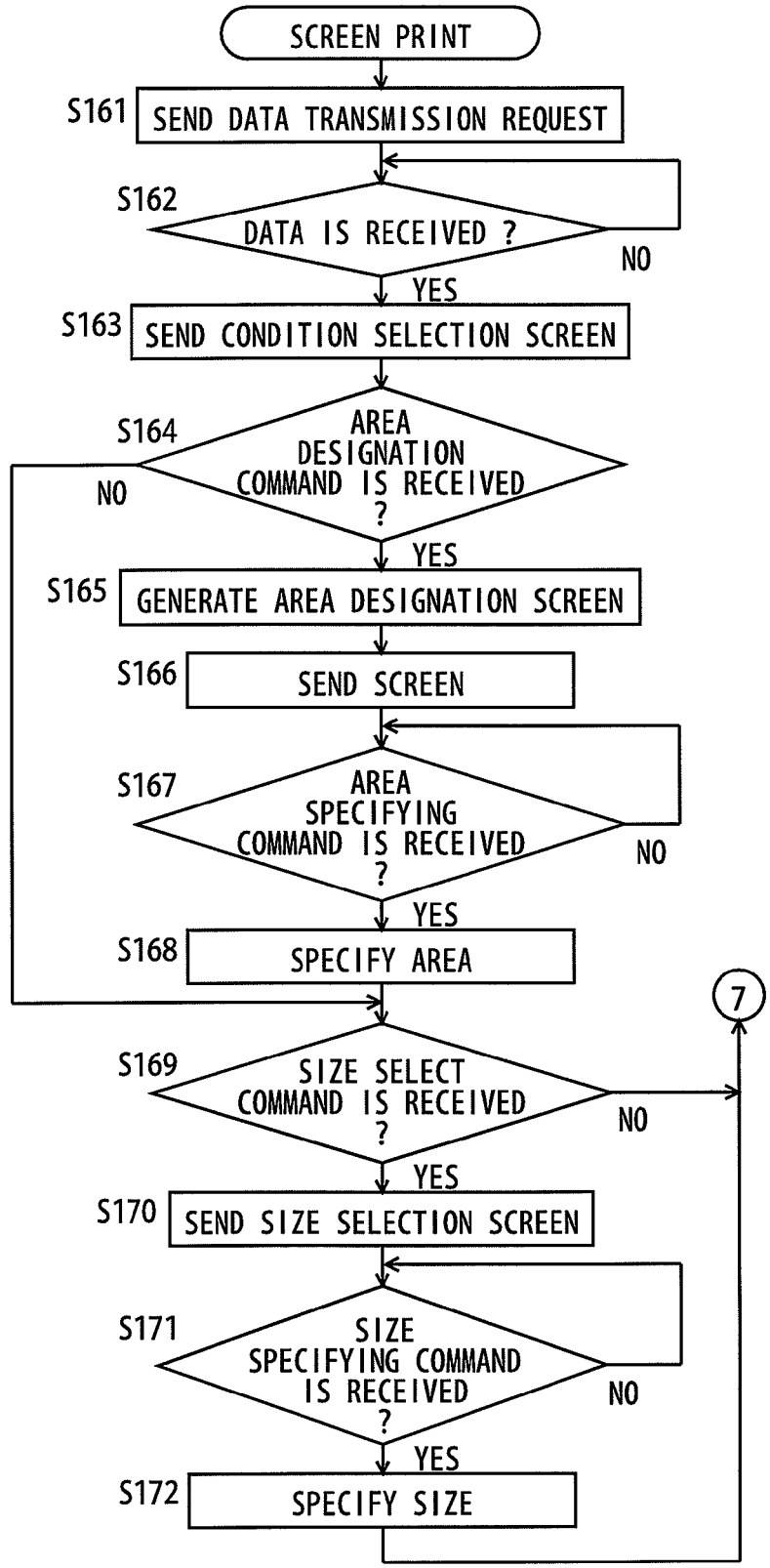
FIGS. 21A and 21B are flowcharts each showing an exemplary flow of a screen print process.
Figure 21B:
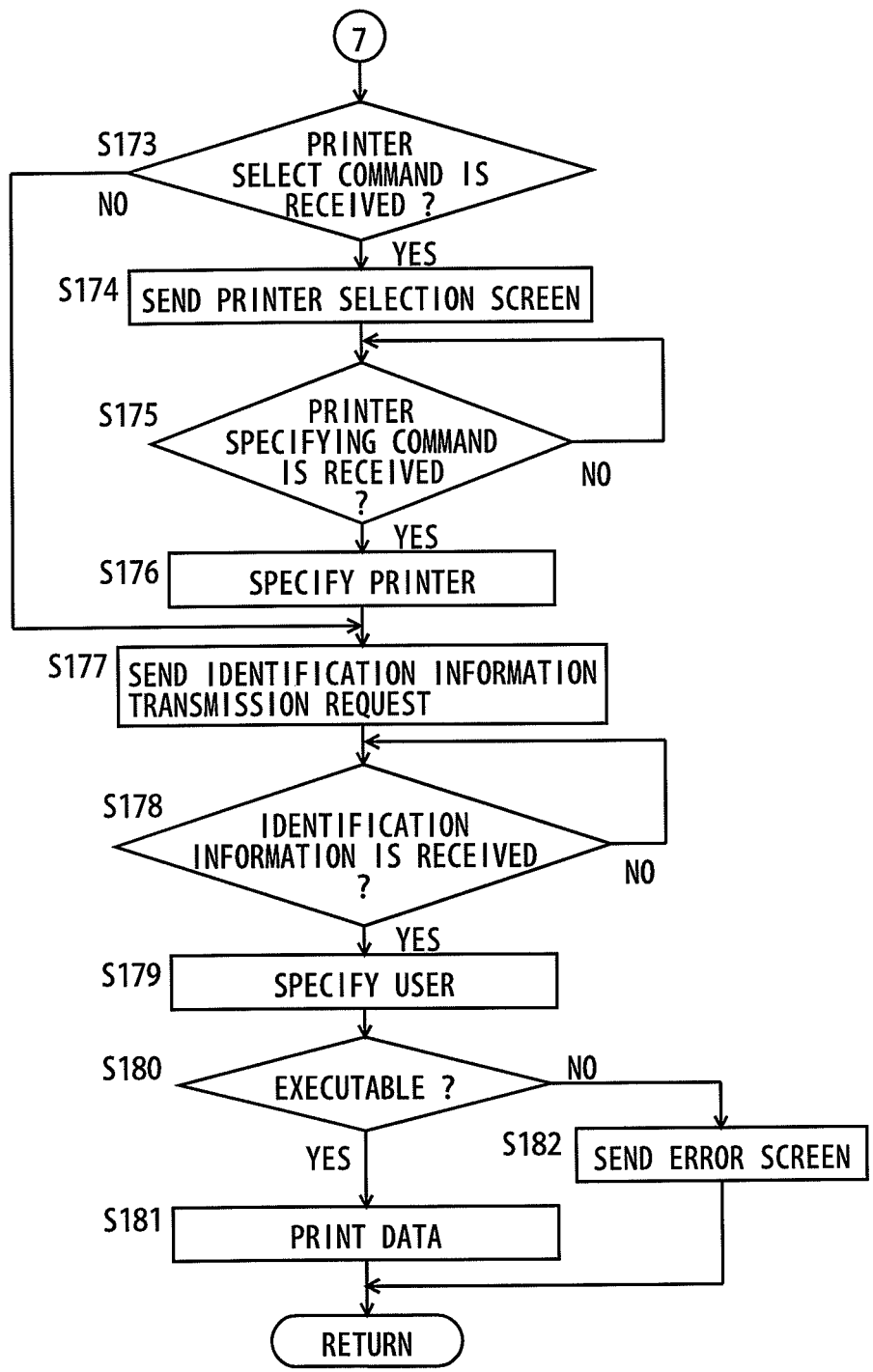

FIGS. 21A and 21B are flowcharts each showing an exemplary flow of the screen print process. The screen print process is a process executed in step S83 of the MFP remote control process shown in FIG. 12. Referring to FIGS. 21A and 21B, in step S161, a data transmission request is sent to PC 200 through network I/F 118. Upon receiving the data transmission request, PC 200 sends back display data 231 to be displayed by projector 500, to MFP 100. In step S162, the process waits until network I/F 118 receives display data 231 from PC 200, and if display data 231 is received, the process proceeds to step S163. In step S163, a condition selection screen is sent to PC 200. The condition selection screen is one of the device's own operation screens.

Figure 22:
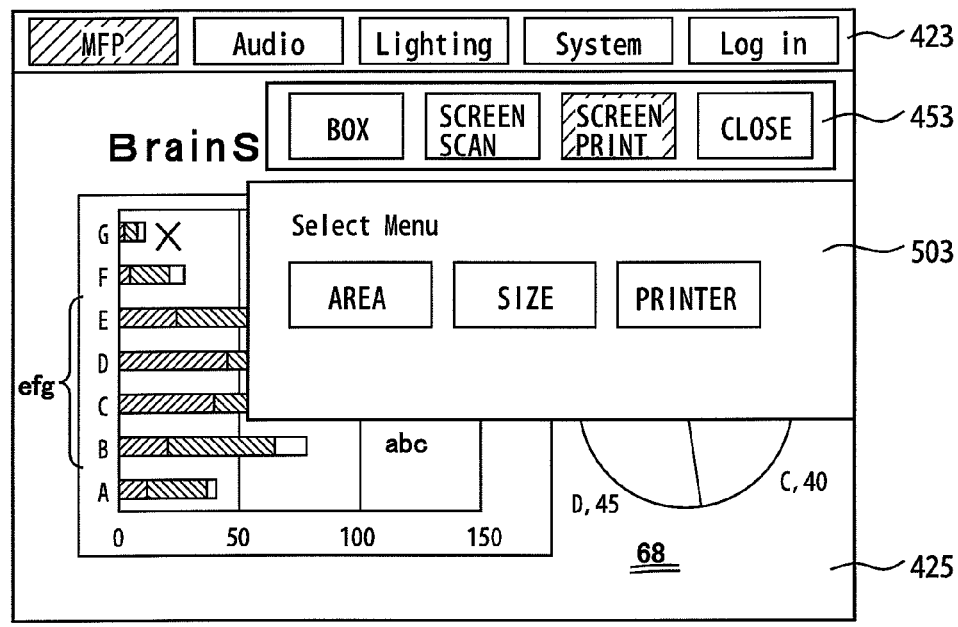
FIG. 22 is an illustration showing an exemplary window including an image of a condition selection screen.

FIG. 22 is an illustration showing an exemplary window including an image of the condition selection screen. FIG. 22 shows a display screen which appears after the condition selection screen is received in a state in which display screen 451 shown in FIG. 13 is displayed. Referring to FIG. 22, a display screen 501 displays a window 503 including an image of the condition selection screen, which is superimposed on window 425 including the image of page data.

Window 503 includes a button represented by "Area," a button represented by "Size," and a button represented by "Printer," which are selectable. The condition selection screen includes a command to transmit an area designation command in relation to the button represented by "Area," a command to transmit a size select command in relation to the button represented by "Size," and a command to transmit a printer select command in relation to the button represented by "Printer."

Returning to FIGS. 21A and 21B, in step S164, it is determined whether network I/F 118 receives the area designation command from PC 200. If the area designation command is received, the process proceeds to step S165. If not, the process proceeds to step S169. In step S165, an area designation screen is generated. The area designation screen, which is one of the device's own operation screens, includes the image of the data received in step S162, and includes a command to accept designation of a part of or the entire area of that data and a command to transmit the designated area and an area specifying command. In the next step S166, the generated area designation screen is sent to PC 200.

Figure 23:
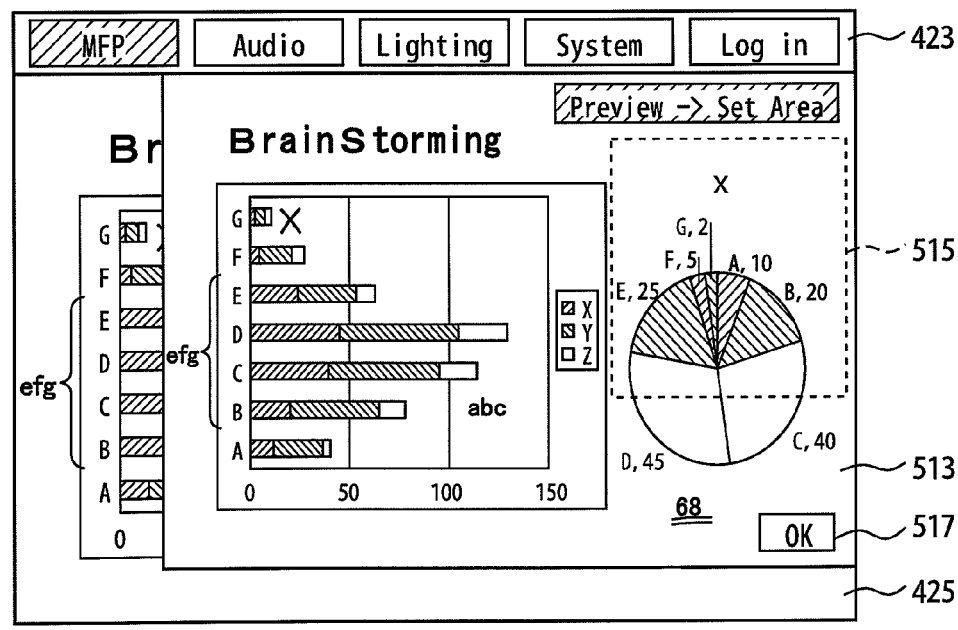
FIG. 23 is an illustration showing an exemplary window including an image of an area designation screen.

FIG. 23 is an illustration showing an exemplary window including an image of the area designation screen. FIG. 23 shows a display screen which appears after the area designation screen is received in a state in which display screen 501 shown in FIG. 22 is displayed. Referring to FIG. 23, a display screen 511 displays a window 513 including the image of the area designation screen, which is superimposed on window 425 including the image of page data. Window 513 includes the image identical to the image of page data and a button 517 represented by "OK."

If the user points to two points in window 513 appearing on the drawing plane of whiteboard 400 with any one of pens 411A-411E and thereafter points to button 517, PC 200 specifies a rectangular area 515 having the designated two points as opposing vertexes and sends area information that specifies an area 515 and the area specifying command to MFP 100.

Returning to FIGS. 21A and 21B, in step S167, it is determined whether network I/F 118 receives the area specifying command. The process waits until the area specifying command is received, and if the area specifying command is received, the process proceeds to step S168. In step S168, an area to be printed is specified from the data received in step S162, based on the area information received together with the area specifying command.

In step S169, it is determined whether network I/F 118 receives the size select command from PC 200. If the size select command is received, the process proceeds to step S170. If not, the process proceeds to step S173. In step S170, a size selection screen is sent to PC 200. The size selection screen, which will not be detailed, is a Web page for selecting the size of print paper and includes buttons corresponding to different sizes, where each button is related to a corresponding size and a command to transmit a size specifying command.

In step S171, it is determined whether network I/F 118 receives the size specifying command. The process waits until the size specifying command is received, and if the size specifying command is received, the process proceeds to step S172. In step S172, the size of print paper is specified based on the size received together with the size specifying command.

In step S173, it is determined whether network I/F 118 receives the printer select command from PC 200. If the printer select command is received, the process proceeds to step S174. If not, the process proceeds to step S177. In step S174, a printer selection screen is sent to PC 200. The printer selection screen, which will not be detailed, is a Web page for selecting a printer to be used for printing and includes buttons corresponding to different printers, where each button is related to a printer name and a command to transmit a printer specifying command.

In step S175, it is determined whether network I/F 118 receives the printer specifying command. The process waits until the printer specifying command is received, and if the printer specifying command is received, the process proceeds to step S176. In step S176, the printer to be used for printing is specified based on the printer name received together with the printer specifying command.

In step S177, a transmission request for identification information is sent to PC 200 through network I/F 118. In step S178, the process waits until network I/F 118 receives the identification information from PC 200, and if the identification information is received, the process proceeds to step S179.

In step S179, the user who gives an instruction for screen print is specified. Specifically, the ID associated with the identification information received in step S178 is obtained.

In the next step S180, it is determined whether the user specified in step S179 has the authority to execute a print process. Specifically, it is determined whether the print process is set to be executable in the restriction table, for the ID obtained in step S179. If it is set to be executable, the process proceeds to step S181. If not, the process proceeds to step S182. In step S182, a Web page including an error screen is sent to PC 200, and the process then returns to the remote control process. Accordingly, a window including the image of the error screen is generated by PC 200, and the image of the error screen is projected onto the drawing plane of whiteboard 400.

On the other hand, in step S181, data is printed. The data to be printed is the data received in step S162 if the area designation command is not received, or the area specified in step S168 of the data received in step S162 if the area designation command is received. The size of print paper is the size specified in step S172 if the size select command is received, or the size set by default if the size select command is not received. The printer to be used for printing is the printer specified in step S176 if the printer select command is received, or MFP 100 if the printer select command is not received.

In this way, the user can print the data displayed on whiteboard 400 and can designate the area to be printed, the size of print paper, and the printer to be used for printing, through an operation of pointing at whiteboard 400.

Figure 24:
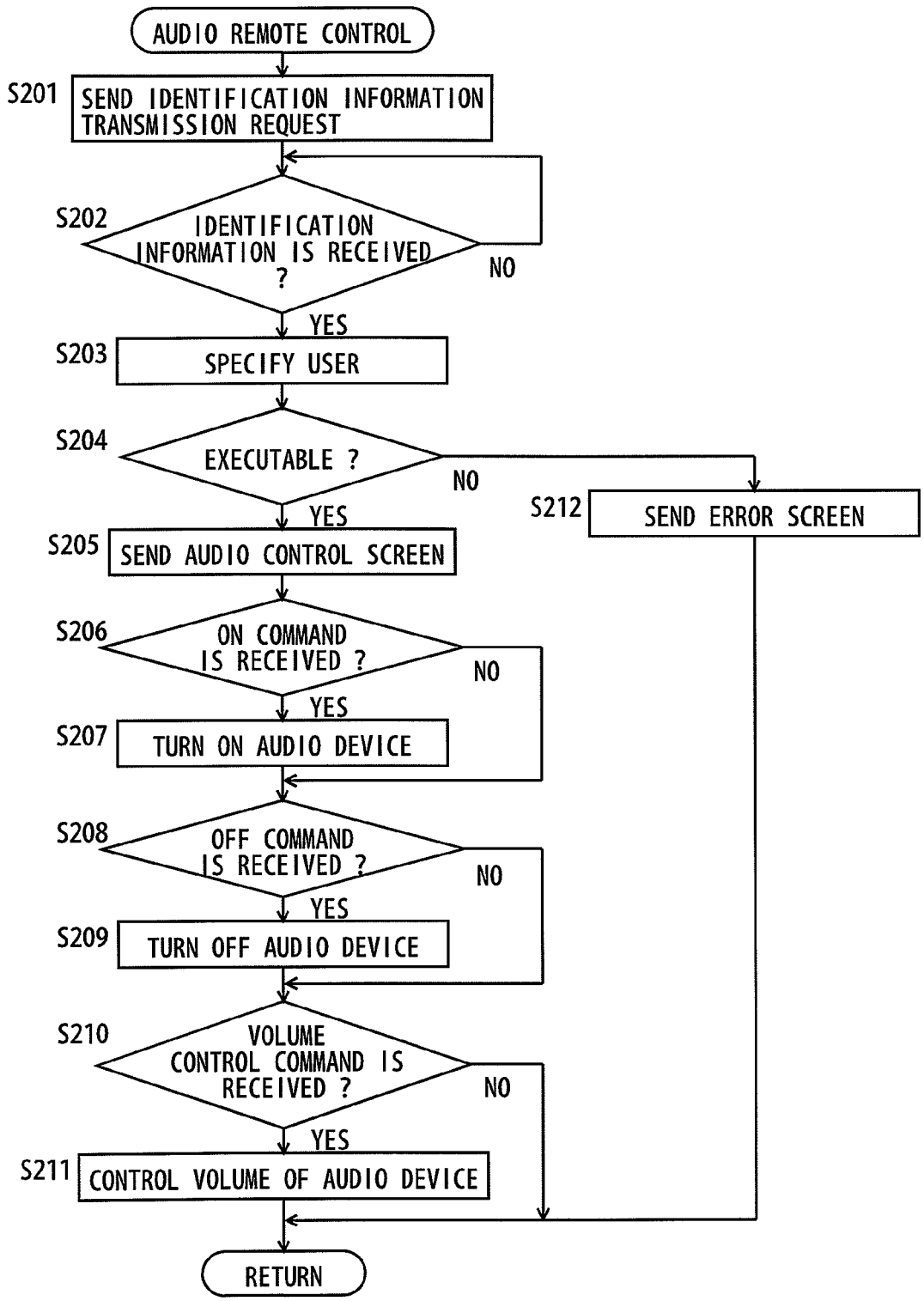
FIG. 24 is a flowchart showing an exemplary flow of an audio remote control process.

FIG. 24 is a flowchart showing an exemplary flow of the audio remote control process. The audio remote control process is a process executed in step S63 of the remote control process shown in FIG. 11. Referring to FIG. 24, in step S201, a transmission request for identification information is sent to PC 200 through network I/F 118. Upon receiving the transmission request for identification information, PC 200 sends back the identification information of pens 411A-411E that is received most recently from whiteboard 400, here, the identification information (pen No.) of the pen that points to the button represented by "Audio" included in window 423 including the image of the menu screen shown in FIG. 5. In step S202, the process waits until network I/F 118 receives the identification information from PC 200. If the identification information is received, the process proceeds to step S203.

In step S203, the user who gives an instruction for audio remote control is specified. Specifically, the ID associated with the identification information received in step S202 is obtained. In the next step S204, it is determined whether the user specified in step S203 has the authority to execute an audio remote operation process. Specifically, it is determined whether the audio remote operation process is set to be executable in the restriction table, for the ID obtained in step S203. If it is set to be executable, the process proceeds to step S205. If not, the process proceeds to step S212. In step S212, a Web page including an error screen is sent to PC 200, and the process returns to the remote control process. Accordingly, a window including the image of the error screen is generated by PC 200, and the image of the error screen is projected onto the drawing plane of whiteboard 400.

On the other hand, in step S205, an audio control screen is sent to PC 200 through network I/F 118. The audio control screen is a remote operation screen for accepting an operation for controlling audio device 330.

Figure 25:
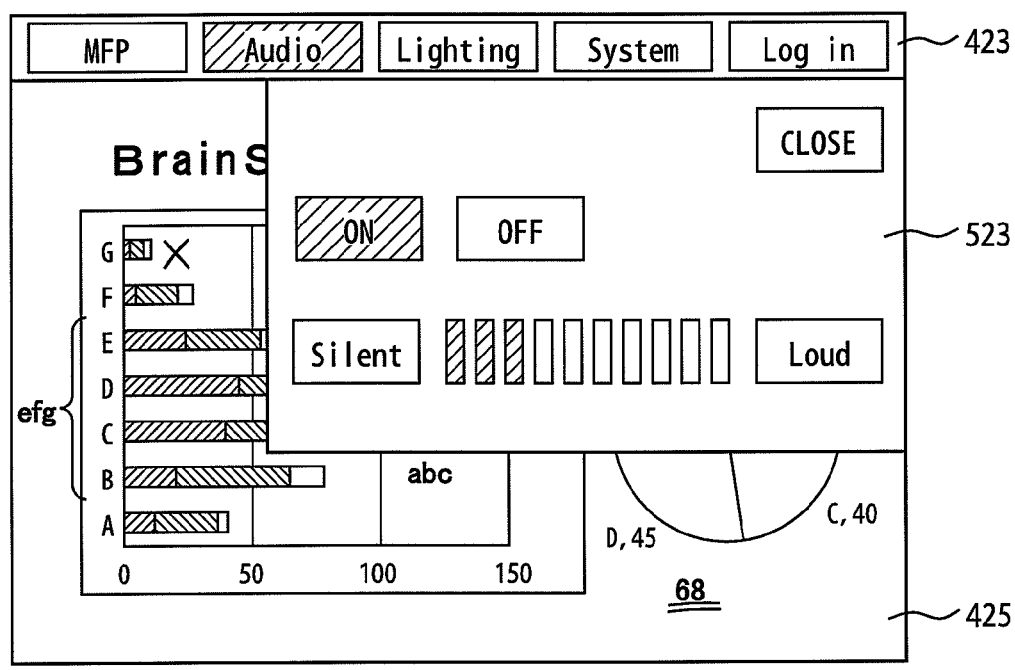
FIG. 25 is an illustration showing an exemplary window including an image of an audio control screen.

FIG. 25 is an illustration showing an exemplary window of the audio control screen. FIG. 25 shows a display screen which appears after the audio control screen is received in a state in which display screen 421 shown in FIG. 5 is displayed. Referring to FIG. 25, a display screen 521 displays a window 523 including an image of the audio control screen, which is superimposed on window 425 including the image of page data.

Window 523 includes a button represented by "ON," a button represented by "OFF," a button represented by "Loud,"
and a button represented by "Silent," which are selectable. The audio operation screen includes a command to transmit an ON command in relation to the button represented by "ON," a command to transmit an OFF command in relation to the button represented by "OFF," a command to transmit a volume up command in relation to the button represented by "Loud," and a command to transmit a volume down command in relation to the button represented by "Silent."

Returning to FIG. 24, in step S206, it is determined whether network I/F 118 receives the ON command from PC 200. If the ON command is received, the process proceeds to step S207. If not, step S207 is skipped, and the process proceeds to step S208. In step S207, audio device 330 is controlled through network I/F 118 such that audio device 330 is set ON. The process then proceeds to step S208.

In step S208, it is determined whether network I/F 118 receives the OFF command from PC 200. If the OFF command is received, the process proceeds to step S209. If not, step S209 is skipped, and the process proceeds to step S210. In step S209, audio device 330 is controlled through network I/F 118 such that audio device 330 is set OFF. The process then proceeds to step S210.

In step S210, it is determined whether network I/F 118 receives a volume control command from PC 200. The volume control command includes the volume up command and the volume down command. If either the volume up command or the volume down command is received, the process proceeds to step S211. If not, step S211 is skipped, and the process returns to the remote control process shown in FIG. 11.

In step S211, audio device 330 is controlled through network I/F 118 such that the volume of audio device 330 is controlled. If the volume up command is received, the volume is increased. If the volume down command is received, the volume is decreased.

In this manner, the user can remotely control audio device 330 to turn on or off the power and to increase/decrease the volume, through an operation of pointing at whiteboard 400.

Figure 26:
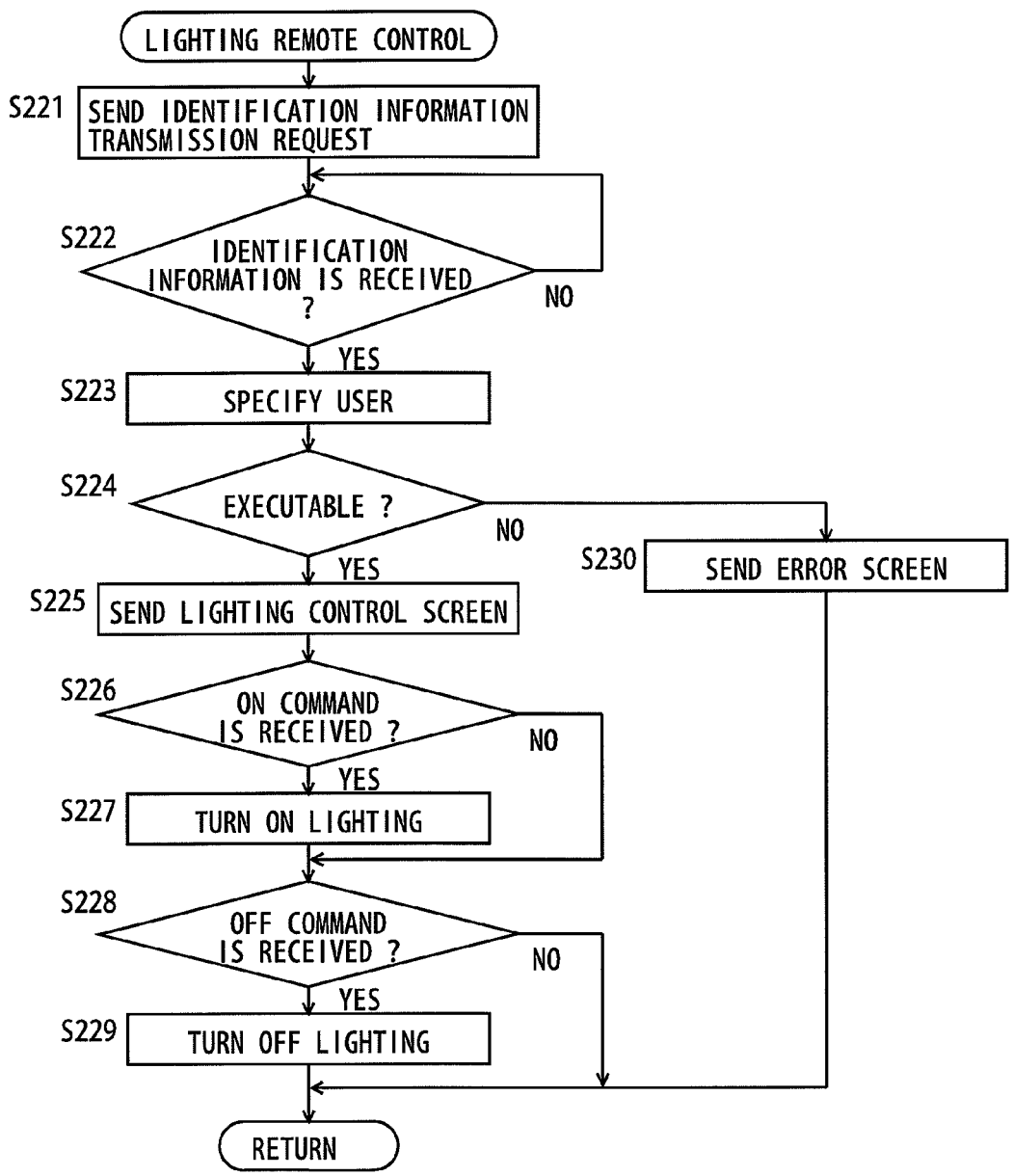
FIG. 26 is a flowchart showing an exemplary flow of a lighting remote control process.

FIG. 26 is a flowchart showing an exemplary flow of the lighting remote control process. The lighting remote control process is a process executed in step S65 of the remote control process shown in FIG. 11. Referring to FIG. 26, in step S221, a transmission request for identification information is sent to PC 200 through network I/F 118. Upon receiving the transmission request for identification information, PC 200 sends back the identification information of pens 411A-411E that is received most recently from whiteboard 400, here, the identification information (pen No.) of the pen that points to the button represented by "Lighting" included in window 423 including the image of the menu screen shown in FIG. 5. In step S222, the process waits until network I/F 118 receives the identification information from PC 200. If the identification information is received, the process proceeds to step S223.

In step S223, the user who gives an instruction for lighting remote control is specified. Specifically, the ID associated with the identification information received in step S222 is obtained. In the next step S224, it is determined whether the user specified in step S223 has the authority to execute a lighting remote operation process. Specifically, it is determined whether the lighting remote operation process is set to be executable in the restriction table, for the ID obtained in step S223. If it is set to be executable, the process proceeds to step S225. If not, the process proceeds to step S230. In step S230, a Web page including an error screen is sent to PC 200, and the process returns to the remote control process. Accordingly, a window including the image of the error screen is generated by PC 200, and the image of the error screen is projected onto the drawing plane of whiteboard 400.

On the other hand, in step S225, a lighting control screen is sent to PC 200 through network I/F 118. The lighting control screen is a remote operation screen for accepting an operation for controlling lighting device 320.

Figure 27:
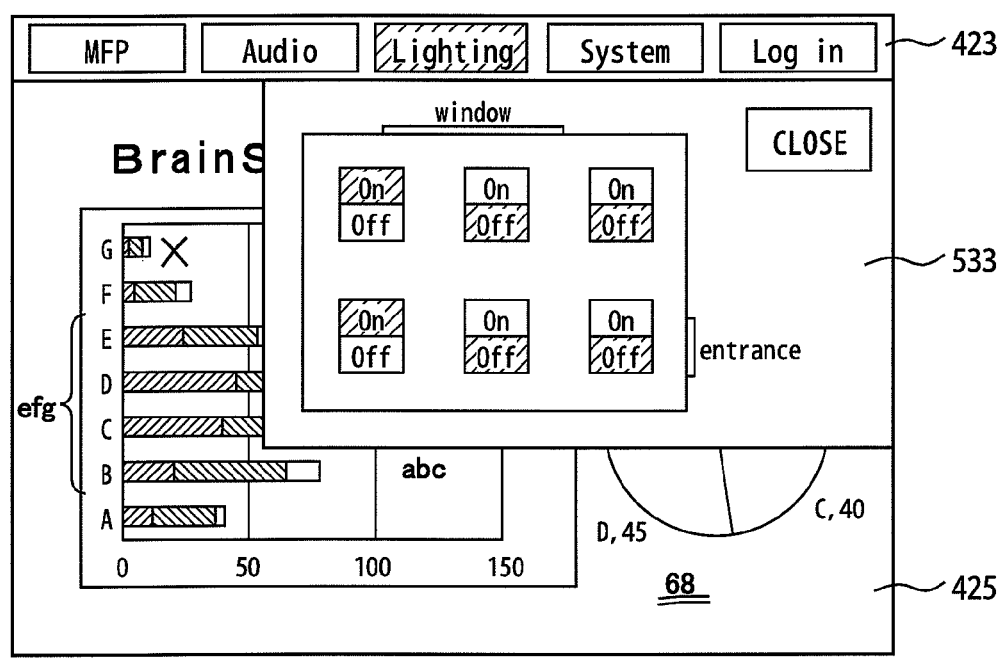
FIG. 27 is an illustration showing an exemplary window including an image of a lighting control screen.

FIG. 27 is an illustration showing an exemplary window of the lighting control screen. FIG. 27 shows a display screen which appears after the lighting control screen is received in a state in which display screen 421 shown in FIG. 5 is displayed. Referring to FIG. 27, a display screen 531 displays a window 533 including an image of the lighting control screen, which is superimposed on window 425 including the image of page data.

Window 533 includes a button represented by "ON" and a button represented by "OFF," which are selectable for each of six lightings. The lighting control screen includes a command to transmit lighting identification information identifying one of six lightings and an ON command, in relation to each of the six buttons represented by "ON," and includes a command to transmit lighting identification information identifying one of six lightings and an OFF command, in relation to each of the six buttons represented by "OFF."

Returning to FIG. 26, in step S226, it is determined whether network I/F 118 receives the ON command from PC 200. If the ON command is received, the process proceeds to step S227. If not, step S227 is skipped, and the process proceeds to step S228. In step S227, lighting device 320 is controlled through network I/F 118 such that, of the six lightings owned by lighting device 320, the lighting specified by the lighting identification information received together with the ON command is set ON. The process then proceeds to step S228.

In step S228, it is determined whether network I/F 118 receives the OFF command from PC 200. If the OFF command is received, the process proceeds to step S229. If not, step S229 is skipped, and the process returns to the remote control process shown in FIG. 11.

In step S229, lighting device 320 is controlled through network I/F 118 such that, of the six lightings owned by lighting device 320, the lighting specified by the lighting identification information received together with the OFF command is set OFF. The process then returns to the remote control process shown in FIG. 11.

In this manner, the user can remotely control lighting device 320 to turn on or off the lightings, through an operation of pointing at whiteboard 400.

Figure 28A:
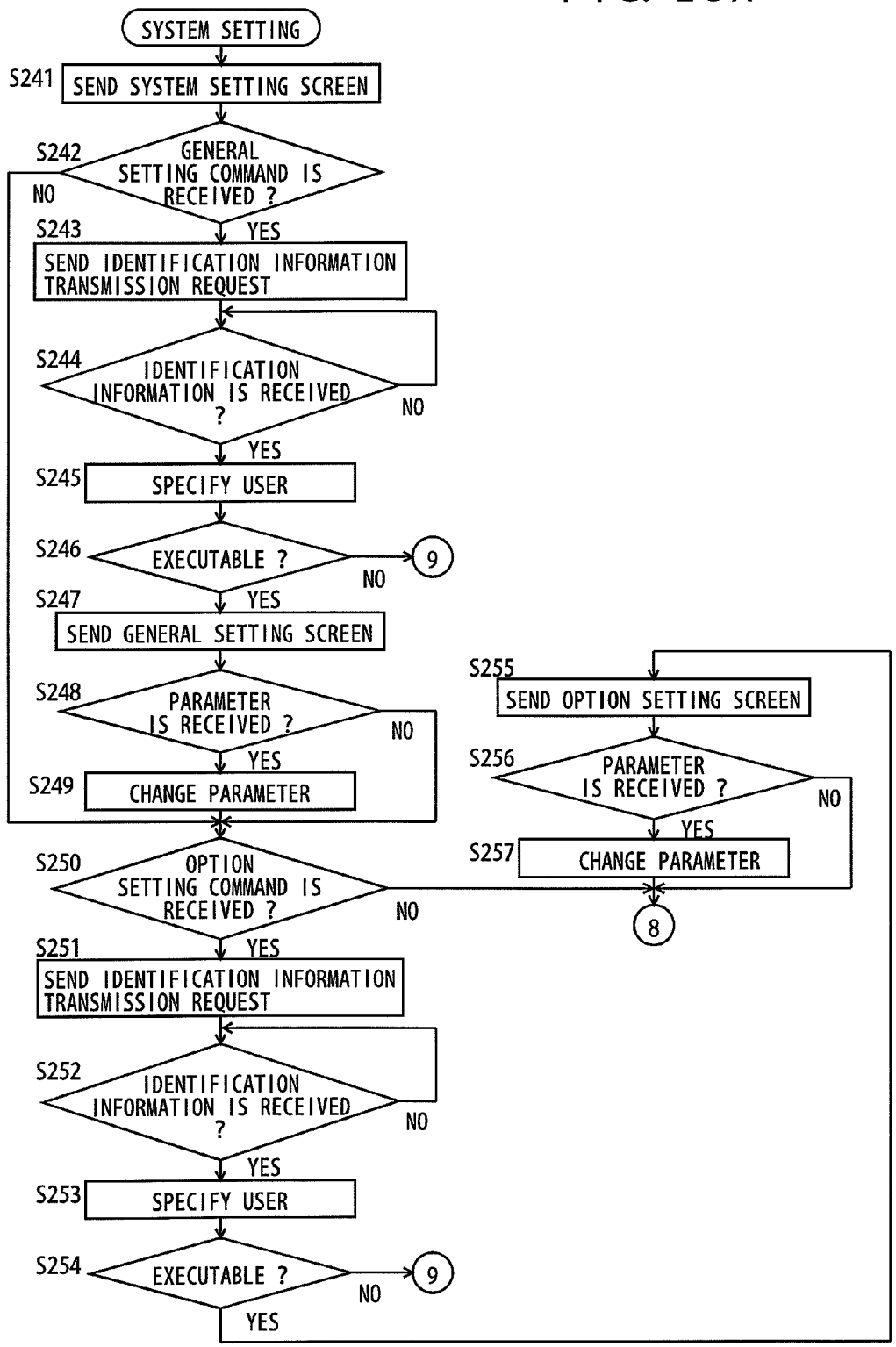
FIGS. 28A and 28B are flowcharts each showing an exemplary flow of a system setting process.
Figure 28B:
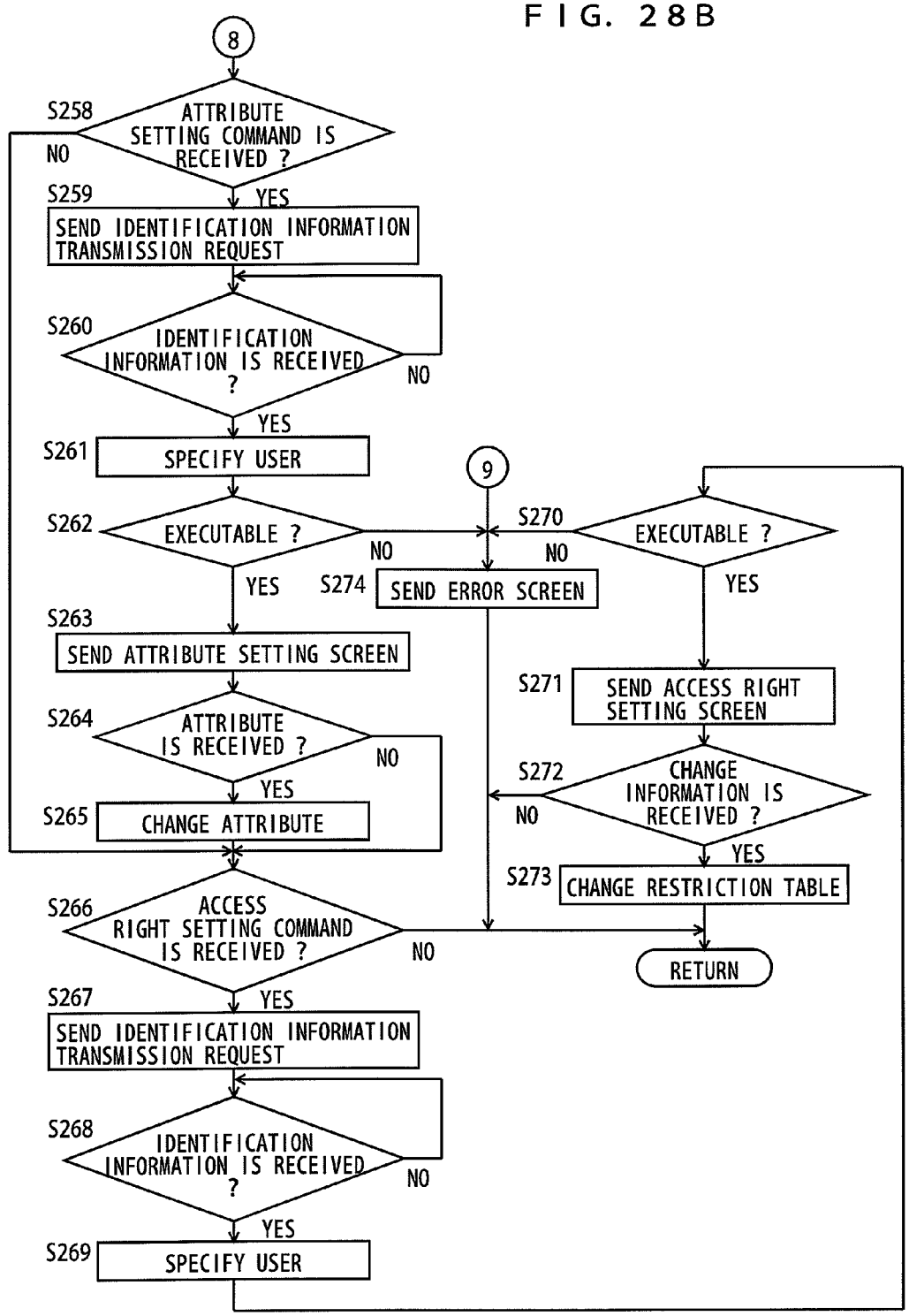

FIGS. 28A and 28B are flowcharts each showing an exemplary flow of the system setting process. The system setting process is a process executed in step S67 of the remote control process shown in FIG. 11. Referring to FIGS. 28A and 28B, in step S241, a system setting screen is sent to PC 200 through network I/F 118. The system setting screen is a device's own operation screen for accepting an operation of changing the settings of parameters for use in a process in meeting system 1.

Figure 29:
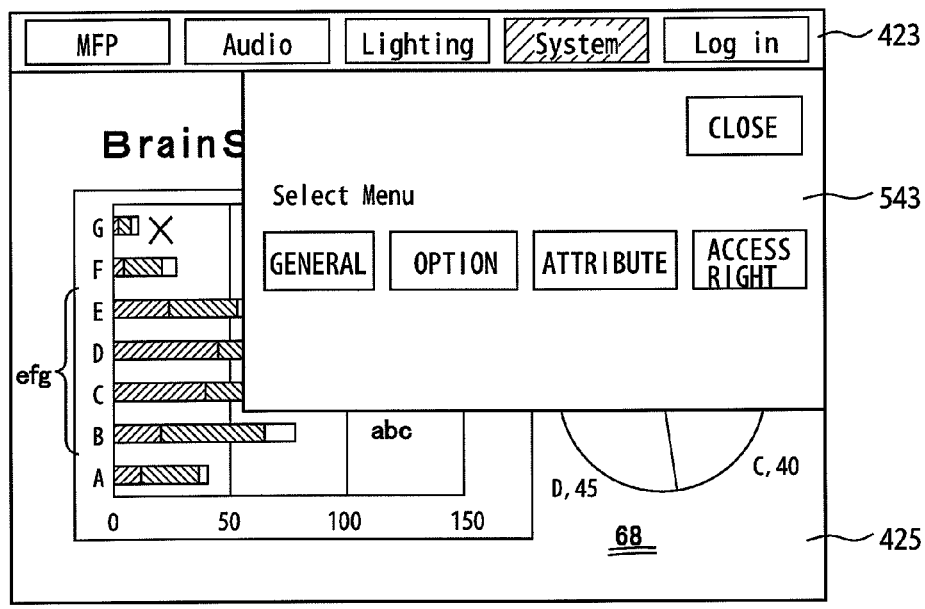
FIG. 29 is an illustration showing an exemplary window including an image of a system setting screen.

FIG. 29 is an illustration showing an exemplary window including an image of the system setting screen. FIG. 29 shows a display screen 541 which appears after the system setting screen is received in a state in which display screen 421 shown in FIG. 5 is displayed. Referring to FIG. 29, display screen 541 displays a window 543 including an image of the system setting screen, which is superimposed on window 425 including the image of page data.

Window 543 includes a button represented by "General," a button represented by "Option," a button represented by "Attribute," and a button represented by "Access Right." The system setting screen includes a command to transmit a general setting command in relation to the button represented by "General," a command to transmit an option setting command in relation to the button represented by "Option," a command to transmit an attribute setting command in relation to the button represented by "Attribute," and a command to transmit an access right setting command in relation to the button represented by "Access Right."

Returning to FIGS. 28A and 28B, in step S242, it is determined whether network I/F 118 receives the general setting command from PC 200. If the general setting command is received, the process proceeds to step S243. If not, the process proceeds to step S250. In step S243, a transmission request for identification information is sent to PC 200 through network I/F 118. Upon receiving the transmission request for identification information, PC 200 sends back the identification information of pens 411A-411E that is received most recently from whiteboard 400, here, the identification information (pen No.) of the pen that points to the button represented by "General" included in window 543 including the image of the system setting screen shown in FIG. 29. In step S244, the process waits until network I/F 118 receives the identification information from PC 200. If the identification information is received, the process proceeds to step S245.

In step S245, the user who gives an instruction to send the general setting command is specified. Specifically, the ID associated with the identification information received in step S244 is obtained. In the next step S246, it is determined whether the user specified in step S245 has the authority to change a parameter of the general settings. Specifically, it is determined whether the process of changing the parameter of the general settings is set to be executable in the restriction table, for the ID obtained in step S245. If it is set to be executable, the process proceeds to step S247. If not, the process proceeds to step S274. In step S274, a Web page including an error screen is sent to PC 200, and the process returns to the remote control process. Accordingly, a window including the image of the error screen is generated by PC 200, and the image of the error screen is projected onto the drawing plane of whiteboard 400.

On the other hand, in step S247, a general setting screen is sent to PC 200 through network I/F 118. The general setting screen, which will not be detailed, is a device's own operation screen for accepting an operation of changing a parameter for use in a general process in meeting system 1, and includes a command to transmit a changed parameter to MFP 100 if a parameter is changed.

In the next step S248, it is determined whether network I/F 118 receives a parameter from PC 200. If a parameter is received, the process proceeds to step S249. If not, the process proceeds to step S250. In step S249, the received parameter is set in the item of general settings received together. The process then proceeds to step S250.

In step S250, it is determined whether network I/F 118 receives the option setting command from PC 200. If the option setting command is received, the process proceeds to step S251. If not, the process proceeds to step S258. In step S251, a transmission request for identification information is sent to PC 200 through network I/F 118. Upon receiving the transmission request for identification information, PC 200 sends back the identification information of pens 411A-411E that is received most recently from whiteboard 400, here, the identification information (pen No.) of the pen that points to the button represented by "Option" included in window 543 including the image of the system setting screen shown in FIG. 29. In step S252, the process waits until network I/F 118 receives the identification information from PC 200. If the identification information is received, the process proceeds to step S253.

In step S253, the user who gives an instruction to send the option setting command is specified. In the next step S254, referring to the restriction table, it is determined whether the user specified in step S253 has the authority to change a parameter of the option settings. If the user has the authority, the process proceeds to step S255. If not, the process proceeds to step S274.

In step S255, an option setting screen is sent to PC 200 through network I/F 118. The option setting screen, which will not be detailed, is a device's own operation screen for accepting an operation of changing the setting of a parameter for use in an extended process apart from the general settings in meeting system 1, and includes a command to transmit a changed parameter to MFP 100, if a parameter is changed.

In the next step S256, it is determined whether network I/F 118 receives a parameter from PC 200. If a parameter is received, the process proceeds to step S257. If not, the process proceeds to step S258. In step S257, the received parameter is set in the item of the option settings received together. The process then proceeds to step S258.

In step S258, it is determined whether network I/F 118 receives the attribute setting command from PC 200. If the attribute setting command is received, the process proceeds to step S259. If not, the process proceeds to step S266. In step S259, a transmission request for identification information is sent to PC 200 through network I/F 118. Upon receiving the transmission request for identification information, PC 200 sends back the identification information of pens 411A-411E that is received most recently from whiteboard 400, here, the identification information (pen No.) of the pen that points to the button represented by "Attribute" included in window 543 including the image of the system setting screen shown in FIG. 29. In step S260, the process waits until network I/F 118 receives the identification information from PC 200. If the identification information is received, the process proceeds to step S261.

In step S261, the user who gives an instruction to send the attribute setting command is specified. In the next step S262, referring to the restriction table, it is determined whether the user specified in step S261 has the authority to change a parameter of the attribute settings. If the user has the authority, the process proceeds to step S263. If not, the process proceeds to step S274.

In step S263, an attribute setting screen is sent to PC 200 through network I/F 118. The attribute setting screen, which will not be detailed, is a device's own operation screen for accepting an operation of changing the setting of an attribute in meeting system 1, and includes a command to transmit a changed attribute to MFP 100, if an attribute is changed. The attribute includes, for example, the association between pen No. and color.

In the next step S264, it is determined whether network I/F 118 receives an attribute from PC 200. If an attribute is received, the process proceeds to step S265. If not, the process proceeds to step S266. In step S265, the attribute set until then is replaced with the received attribute. The process then proceeds to step S266.

In step S266, it is determined whether network I/F 118 receives the access right setting command from PC 200. If the access right setting command is received, the process proceeds to step S267. If not, the process returns to the remote control process shown in FIG. 11.

In step S267, a transmission request for identification information is sent to PC 200 through network I/F 118. Upon receiving the transmission request for identification information, PC 200 sends back the identification information of pens 411A-411E that is received most recently from whiteboard 400, here, the identification information (pen No.) of the pen that points to the button represented by "Access Right" included in window 543 including the image of the system setting screen shown in FIG. 29. In step S268, the process waits until network I/F 118 receives the identification information from PC 200. If the identification information is received, the process proceeds to step S269.

In step S269, the user who gives an instruction to send the access right setting command is specified. In the next step S270, referring to the restriction table, it is determined whether the user specified in step S269 has the authority to change the access right. If the user has the authority and can execute the process of changing the access right, the process proceeds to step S271. If not, the process proceeds to step S274.

In step S271, an access right setting screen is sent to PC 200 through network I/F 118. The access right setting screen is a device's own operation screen for accepting an operation of changing the restriction table.

Figure 30:
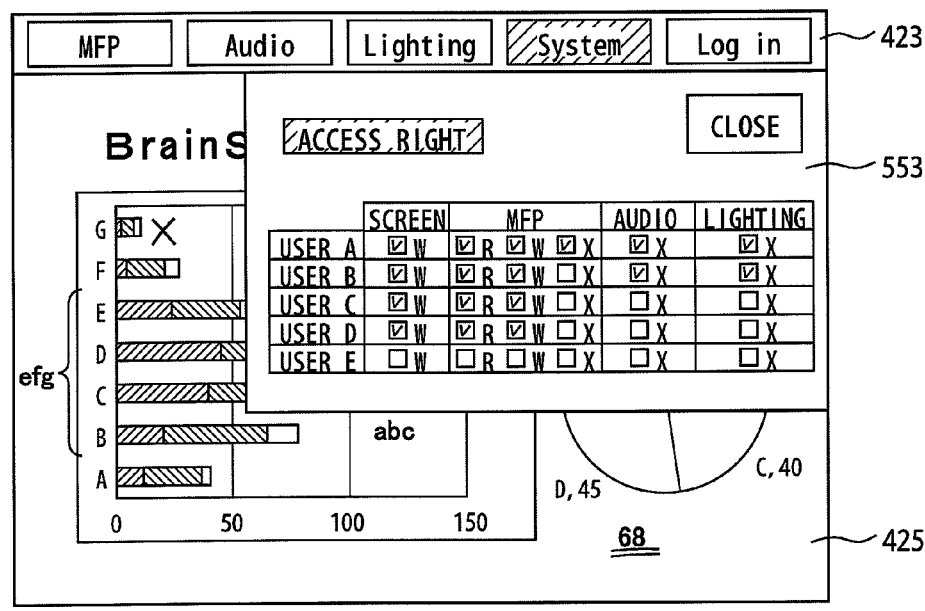
FIG. 30 is an illustration showing an exemplary window including an image of an access right setting screen.

FIG. 30 is an illustration showing an exemplary window including an image of the access right setting screen. FIG. 30 shows a display screen 551 which appears after the access right setting screen is received in a state in which display screen 541 shown in FIG. 29 is displayed. Referring to FIG. 30, display screen 551 displays a window 553 including the image of the access right setting screen, which is superimposed on window 425 including the image of page data.

Window 553 includes the restriction table. The restriction table defines, for each user, whether a process is executable or not for at least one operation on each of the screen, MFP 100, audio device 330, and lighting device 320. The process for the screen includes the above-noted screen scan process and screen print process. The process for MFP 100 includes the above-noted MFP remote control process and system setting process. The process for audio device 330 includes the above-noted audio remote control process. The process for lighting device 320 includes the above-noted lighting remote control process. The symbol "W" represents a saving process, the symbol "R" represents a reading process, and the symbol "X" represents a process other than the saving and reading processes.

For example, for "user A," the process "W" for the screen is checked, and therefore the screen scan process and the screen print process are set to be executable. All of the processes "R," "W," "X" for MFP 100 are checked, and therefore execution of all of the MFP remote control processes and the system setting processes is permitted. For the process for audio device 330, "X" is checked and therefore execution of all the processes for audio device 330 is permitted. For the process for lighting device 320, "X" is checked and therefore execution of all the processes for lighting device 320 is permitted.

The access right setting screen includes, if the restriction table is changed, a command to transmit to MFP 100 change information including the ID, process identification information for identifying a changed process, and whether execution is permitted or not.

Returning to FIGS. 28A and 28B, in step S272, it is determined whether network I/F 118 receives the change information from PC 200. If the change information is received, the process proceeds to step S273. If not, the process returns to the remote control process shown in FIG. 11. In step S273, the restriction table is changed in accordance with the received change information. The process then returns to the remote control process shown in FIG. 11.

Accordingly, the users can change the general settings, the option settings, the attributes, and the access right by pointing at whiteboard 400 with pens 411A-411E.

Although in the foregoing embodiment, whiteboard 400 detects which of pens 411A-411E, which of pens 411A-411E can be detected by picking up an image of the drawing plane of whiteboard 400 for example by a video camera and then detecting the drawn color from the obtained picked-up image. Furthermore, a drawing image can be detected by comparing a plurality of images that are picked up at different times.

In the foregoing description, meeting system 1 has been illustrated as an example of the remote control process. However, it is needless to say that the present invention can be understood as a remote control method or a remote control program allowing PC 200 to execute the processes in FIG. 9 and FIG. 10 and allowing MFP 100 to execute the processes shown in FIG. 11, FIG. 12, FIGS. 14A and 14B, FIGS. 18A and 18B, FIGS. 21A and 21B, FIG. 24, FIG. 26, and FIGS. 28A and 28B.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A remote control system comprising a display control device for controlling a display device which displays an image on a projection plane, and a remote control device capable of remotely controlling an external device, said display control device including a browsing portion to receive an operation screen from said remote control device, a display control portion to allow said display device to project said operation screen received by said browsing portion onto said projection plane, and a position detection portion to detect a position pointed to by a user in said projected operation screen, wherein said browsing portion transmits to said remote control device a command which is included in said operation screen and is related to said position in said operation screen detected by said position detection portion, said remote control device including an operation screen transmission portion to transmit to said display control device an operation screen for accepting an operation for controlling said external device or the device itself, said operation screen including a command for specifying control, a command reception portion to receive a command transmitted from said display control device, and a process control portion to control said external device or the device itself in accordance with said command received by said command reception portion.

2. The remote control system according to claim 1, said display control device further including a device detection portion to detect a pointing device that points to a position detected by said position detection portion, and an identification information transmission portion to transmit to said remote control device pointing device identification information for identifying said detected pointing device, in response to a request from said remote control device, said remote control device further including an identification information request portion to request transmission of said pointing device identification information of said pointing device from said display control device, wherein said operation screen transmission portion includes an authentication screen transmission portion to transmit to said display control device an authentication screen for accepting authentication information for authenticating a user, said authentication screen including an authentication command, said remote control device further including an authentication portion to, if said command received by said command reception portion is said authentication command, authenticate a user in accordance with the authentication information received together with said authentication command, an association portion to, if authentication by said authentication portion is successful, associate said pointing device identification information received from said display control device in response to transmission of the request by said identification information request portion, with user identification information of said authenticated user, and a pointing user determination portion to, if a command is received by said command reception portion, determine, as a pointing user who points to said operation screen, a user having the user identification information associated with the pointing device identification information received from said display control device in response to transmission of the request by said identification information request portion.

3. The remote control system according to claim 2, further comprising an image pickup unit to pick up an image of said projection plane, wherein said position detection portion detects a position of a pointer displayed in a superimposed manner on said display screen, from a projection image obtained by said image pickup unit picking up an image of said projection plane, and said device detection portion detects a color of said pointer displayed in a superimposed manner on said projection plane.

4. The remote control system according to claim 2, said remote control device further including an execution determination portion to determine whether said command received by said command reception portion is executable or not for the pointing user determined by said pointing user determination portion, based on a restriction table in which an executable command is related beforehand to said external device or the device itself, for each user.

5. The remote control system according to claim 1, said display control device further including a data transmission portion to, if an image of another data other than said operation screen is displayed by said display control portion, transmit to said remote control device said another data in response to reception of a data transmission request from said remote control device, said remote control device further including a data transmission request portion to, if said command received by said command reception portion is a data request command, transmit a data transmission request to said display control device, and a device's own operation screen generation portion receiving data transmitted from said display control device in response to transmission of said data transmission request to generate a device's own operation screen including an image of the received data, wherein said operation screen transmission portion transmits said generated device's own operation screen to said display device.

6. The remote control system according to claim 5, wherein said device's own operation screen generated by said device's own operation screen generation portion accepts pointing to select a part of an image included in the device's own operation screen and includes a command to allow said display control device to execute a process of transmitting area information indicating the part specified by the accepted pointing.

7. The remote control system according to claim 5, wherein said device's own operation screen generated by said device's own operation screen generation portion includes a command for allowing said remote control device to execute a process on an image included in the device's own operation screen.

8. The remote control system according to claim 1, wherein said operation screen transmission portion includes a remote operation screen transmission portion to transmit to said display control device an operation screen for accepting an operation for remotely controlling said external device, said operation screen including a remote operation command for remotely operating said external device, wherein said process control portion includes a remote control portion to, if said command received by said command reception portion is said remote operation command, control said external device based on the remote operation command.

9. The remote control system according to claim 1, said remote control device further including a process execution portion to execute one or more processes, wherein said operation screen transmission portion includes a device's own operation screen transmission portion to transmit to said display control device a device's own operation screen for accepting an operation for allowing said process execution portion to execute a process, said device's own operation screen including a device's own operation command for allowing said process execution portion to execute a process, and said process control portion includes a device's own control portion to, if said command received by said command reception portion is said device's own operation command, allow said process execution portion to execute a process in accordance with the device's own operation command.

10. The remote control system according to claim 1, further comprising an image pickup unit to pick up an image of said projection plane, wherein said position detection portion detects a position of a pointer displayed in a superimposed manner on said display screen, from a projection image obtained by said image pickup unit picking up an image of said projection plane.

11. A remote control method executed in a display control device for controlling a display device which displays an image on a projection plane, and in a remote control device capable of remotely controlling an external device, said method allowing said display control device to execute the steps of =
receiving an operation screen from said remote control device;
allowing said display device to project said received operation screen onto said projection plane;
detecting a position pointed to by a user in said projected operation screen; and
transmitting to said remote control device a command which is included in said operation screen and is related to the position in said operation screen detected in said step of detecting a position, and said remote control device to execute the steps of:
transmitting to said display control device an operation screen for accepting an operation for controlling said external device or the device itself, said operation screen including a command for specifying control;
receiving a command transmitted from said display control device; and
controlling said external device or the device itself in accordance with said command received in said step of receiving a command.

12. The remote control method according to claim 11, further allowing said display control device to execute the steps of:
detecting a pointing device that points to a position detected in said step of detecting a position; and
transmitting to said remote control device pointing device identification information for identifying said detected pointing device, in response to a request from said remote control device, and said remote control device to execute the steps of:
requesting transmission of said pointing device identification information of said pointing device from said display control device, wherein said step of transmitting an operation screen includes the step of transmitting to said display control device an authentication screen for accepting authentication information for authenticating a user, said authentication screen including an authentication command;

if said command received in said step of receiving a command is said authentication command, authenticating a user in accordance with the authentication information received together with said authentication command;

if authentication in said step of authenticating is successful, associating said pointing device identification information received from said display control device in response to transmission of the request in said step of requesting transmission of pointing device identification information, with user identification information of said authenticated user; and if a command is received in said step of receiving a command, determining, as a pointing user who points to said operation screen, a user having the user identification information associated with the pointing device identification information received from said display control device in response to transmission of the request in said step of requesting transmission of pointing device identification information.

13. The remote control method according to claim 12, wherein said step of detecting a position includes the step of detecting a position of a pointer displayed in a superimposed manner on said display screen, from a projection image obtained by an image pickup device which picks up an image of said projection plane, and said step of detecting a pointing device includes the step of detecting a color of a pointer displayed in a superimposed manner on said projection plane.

14. The remote control method according to claim 12, further allowing said remote control device to execute the step of determining whether a command received in said step of receiving a command is executable or not for the pointing user determined in said step of determining a pointing user, based on a restriction table in which an executable command is related beforehand to said external device or the device itself, for each user.

15. The remote control method according to claim 11, further allowing
   said display control device to execute the step of:
      if an image of another data other than said operation screen is displayed in said step of projecting said operation screen, transmitting to said remote control device said another data in response to reception of a data transmission request from said remote control device,
   said remote control device to execute the steps of:
      if a command received in said step of receiving a command is a data request command, transmitting a data transmission request to said display control device; and
      receiving data transmitted from said display control device in response to transmission of said data transmission request to generate a device's own operation screen including an image of the received data,
   wherein said step of transmitting an operation screen includes the step of transmitting said generated device's own operation screen to said display device.

16. The remote control method according to claim 15, wherein said generated device's own operation screen in said step of transmitting the device's own operation screen accepts pointing to select a part of an image included in the device's own operation screen and includes a command to allow said display control device to execute a process of transmitting area information indicating the part specified by the accepted pointing.

17. The remote control method according to claim 15, wherein said generated device's own operation screen in said step of transmitting the device's own operation screen includes a command for allowing said remote control device to execute a process on an image included in the device's own operation screen.

18. The remote control method according to claim 11, wherein
   said step of transmitting an operation screen includes the step of transmitting to said display control device an operation screen for accepting an operation for remotely controlling said external device, said operation screen including a remote operation command for remotely operating said external device,
   said step of controlling the external device or the device itself includes the step of, if said command received in said step of receiving a command is said remote operation command, controlling said external device based on the remote operation command.

19. The remote control method according to claim 11, wherein
   said remote control device includes a process execution portion to execute one or more processes,
   said step of transmitting an operation screen includes the step of transmitting to said display control device a device's own operation screen for accepting an operation for allowing said process execution portion to execute a process, said device's own operation screen including a device's own operation command for allowing said process execution portion to execute a process, and
   said step of controlling the external device or the device itself includes the step of, if said command received by said command reception portion is said device's own operation command, allowing said process execution portion to execute a process in accordance with the device's own operation command.

20. The remote control method according to claim 11, wherein said step of detecting a position includes the step of detecting a position of a pointer displayed in a superimposed manner on said display screen, from a projection image obtained by an image pickup device picking up an image of said projection plane.

* * * * *